United States Patent
Miyazaki et al.

(10) Patent No.: US 10,971,979 B2
(45) Date of Patent: Apr. 6, 2021

(54) COIL SEGMENT FORMING APPARATUS, COIL SEGMENT FORMING METHOD AND MANUFACTURING APPARATUS OF ELECTRICAL ROTATING MACHINE

(71) Applicant: ODAWARA ENGINEERING CO., LTD., Kanagawa (JP)

(72) Inventors: Yuji Miyazaki, Ashigarakami-gun (JP); Noburo Miyawaki, Ashigarakami-gun (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 207 days.

(21) Appl. No.: 16/214,653

(22) Filed: Dec. 10, 2018

(65) Prior Publication Data
US 2019/0109523 A1  Apr. 11, 2019

Related U.S. Application Data

(63) Continuation of application No. PCT/JP2018/017759, filed on May 8, 2018.

(30) Foreign Application Priority Data

Aug. 4, 2017  (JP) .............................. JP2017-151546

(51) Int. Cl.
*H02K 15/04* (2006.01)
*H02K 15/06* (2006.01)
(Continued)

(52) U.S. Cl.
CPC ......... *H02K 15/0421* (2013.01); *B21F 1/004* (2013.01); *H02K 3/04* (2013.01);
(Continued)

(58) Field of Classification Search
CPC ............ H02K 3/04; H02K 3/12; H02K 15/04; H02K 15/0407; H02K 15/0414;
(Continued)

(56) References Cited

U.S. PATENT DOCUMENTS

2015/0288262 A1  10/2015 Tsuiki et al.

FOREIGN PATENT DOCUMENTS

| CN | 102159336 A | 8/2011 |
| CN | 105934871 A | 9/2016 |

(Continued)

OTHER PUBLICATIONS

International Search Report in Japanese and Written Opinion in Japanese dated Jun. 26, 2018, issued in counterpart International Application No. PCT/JP2018/017759 (11 pages).

(Continued)

*Primary Examiner* — Carl J Arbes
(74) *Attorney, Agent, or Firm* — Westerman, Hattori, Daniels & Adrian, LLP

(57) ABSTRACT

A coil segment forming apparatus, a coil segment forming method and a manufacturing apparatus of an electrical rotating machine, whereby coil segments with various kinds of shape can be formed without exchanging a press die, and it is not necessary that a lot of coil segments of various kinds of shape are preliminarily formed and stocked is provided. The coil segment forming apparatus includes a first bending section for bending in the same plane a linear wire rod into a predetermined shape consisting of a pair of slot insertion portions that are substantially parallel to each other and a linking portion for connecting the pair of slot insertion portions. The first bending section has a plurality of jigs arranged on the same plane for supporting the wire rod, and a plurality of drive mechanisms for moving respectively the plurality of jigs on the same plane so that the wire rod is (Continued)

formed in the predetermined shape based on moving amounts respectively set depending on shape conditions of the coil segment to be formed.

5 Claims, 19 Drawing Sheets

(51) Int. Cl.
  *H02K 3/04* (2006.01)
  *B21F 1/00* (2006.01)
  *B21F 1/04* (2006.01)

(52) U.S. Cl.
  CPC ........... *H02K 15/04* (2013.01); *H02K 15/064* (2013.01); *B21F 1/04* (2013.01); *H02K 15/045* (2013.01); *H02K 2213/03* (2013.01)

(58) Field of Classification Search
  CPC ............. H02K 15/0421; H02K 15/045; H02K 15/064; H02K 2213/03; B21F 1/004; B21F 1/04
  See application file for complete search history.

(56) References Cited

FOREIGN PATENT DOCUMENTS

| | | | |
|---|---|---|---|
| JP | S60-98843 A | | 6/1985 |
| JP | 6-284651 A | | 10/1994 |
| JP | 2000166192 A | * | 6/2000 |
| JP | 2004-297863 A | | 10/2004 |
| JP | 3791426 B | * | 6/2006 |
| JP | 2010234400 A | | 10/2010 |
| JP | 2013-71142 A | | 4/2013 |
| JP | 5251625 B2 | | 7/2013 |
| JP | 2014-007793 | * | 1/2014 |
| JP | 2015-19439 A | | 1/2015 |
| WO | 2006102735 A1 | | 10/2006 |
| WO | 2014/065026 A1 | | 5/2014 |
| WO | 2015/189871 A1 | | 12/2015 |
| WO | 2015/194537 A1 | | 12/2015 |

OTHER PUBLICATIONS

Extended (Supplementary) European Search report dated Feb. 28, 2020, issued in counterpart EP Application No. 18826173.9.
Office Action dated Jan. 25, 2021, issued in counterpart CN Application No. 201880002401.7. (12 pages).

* cited by examiner

COIL SEGMENT FORMING APPARATUS, COIL SEGMENT FORMING METHOD AND MANUFACTURING APPARATUS OF ELECTRICAL ROTATING MACHINE

FIELD OF THE INVENTION

The present invention relates to a coil segment forming apparatus and a coil segment forming method used for coil formation of a stator and a rotor in an electrical rotating machine such as a motor or a generator, and to a manufacturing apparatus of the electrical rotating machine.

BACKGROUND ART

Known is a segment-type coil as a stator coil or a rotor coil of the electrical rotating machine. This segment coil is formed by inserting a plurality of segments (hairpins), each obtained by bending a wire rod in a U-shape, into a plurality of slots arranged along the circumferential direction of the stator or the rotor, respectively, and by joining together free ends of these inserted segments by welding.

In Patent Document 1, a U-shaped segment forming method for the segment-type coil is disclosed. In this method, a wire rod already cut into a predetermined length is pressed by using a pressing tool with one-pair configuration, that is a press die or a press bending die, to form a linking portion of the coil segment, and then a pair of slot insertion portions elongated from the linking portion in parallel with each other is formed by moving a pair of shaping rollers along the coil segment.

RELATED ART DOCUMENT

Patent Document

Patent Document 1: Japanese Patent Publication No. 2004-297863A

SUMMARY OF THE INVENTION

Problem to be Solved by the Invention

According to the conventional coil segment forming method disclosed in Patent Document 1, most of parameters of the coil segment, such as the curved shape of the linking portion of the coil segment and the width between the slot insertion portions of the coil segment, are defined by a die geometry (dimension and shape of pressing surface) of the press die or the press bending die. Therefore, in order to change the curved shape of the linking portion and the width between the slot insertion portions, it is necessary to exchange the press die. In general, a great variety of coil segments with different lengths and angles of the U-shape linking portions and with different widths between the slot insertion portions are mixed in a single coil. Thus, according to the conventional method, even if in case of fabricating a single coil, press dies with various kinds of shape have to be prepared and exchanged with each other for making these coil segments with various kinds of shape. It is possible to reduce the number of exchange of the press die by stocking many of the coil segments with the same shape fabricated by using the same press die and by taking out the stocked coil segment at the time of need. However, the management of the stocked coil segments with various kinds of shape is complicated, and the management of fabricating the coil segments with various kinds of shape without overs and shorts is also complicated.

It is therefore an object of the present invention to provide a coil segment forming apparatus, a coil segment forming method and a manufacturing apparatus of an electrical rotating machine, whereby coil segments with various kinds of shape can be formed without exchanging a press die.

Another object of the present invention is to provide a coil segment forming apparatus, a coil segment forming method and a manufacturing apparatus of an electrical rotating machine, whereby there in no need of forming and stocking in advance of many coil segments of various kinds of shape.

Means to Solve the Problem

According to the present invention, a coil segment forming apparatus includes a first bending section for bending in the same plane a linear wire rod into a predetermined shape consisting of a pair of slot insertion portions that are substantially parallel to each other and a linking portion for connecting the pair of slot insertion portions. The first bending section has a plurality of jigs arranged on the same plane for supporting the wire rod, and a plurality of drive mechanisms for moving respectively the plurality of jigs on the same plane so that the wire rod is formed in the predetermined shape based on moving amounts respectively set depending on shape conditions of the coil segment to be formed.

The jigs are moved based on moving amounts set depending on shape conditions of the coil segment to be formed, in other words, moving amounts of the jigs are set for each coil segment. Thus, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since the wire rod can be bent to a desired shape by the plurality of jigs without using the press die, any scratch on the insulation layer of the wire rod due to the contact with the surface of the press die will never be occurred. Still further, because moving amounts of the jigs can be set for each coil segment to be formed, it is not necessary to form previously and to stock many coil segments with various kinds of shape, the management of the stocked coil segments with various kinds of shape becomes needless. Coil segments with various kinds of shape can be easily formed each time when necessary.

It is preferred that the plurality of drive mechanisms are constituted to rotate or linearly move the plurality of jigs based on set data of the moving amounts, respectively.

Also, it is preferred that the plurality of drive mechanisms are constituted to rotate or linearly move the plurality of jigs based on set data of rotating angles or moving distances, respectively.

It is further preferred that the plurality of jigs are arranged with the equal number to each other in left-side and right-side of a bending centerline of the first bending section, and the plurality of jigs arranged in the left-side and the right-side are supported respectively by a pair of base members arranged in the left-side and the right-side, and that the plurality of drive mechanisms are constituted to rotate the pair of base members around a point located on the bending centerline as a turning center.

In this case, it is more preferred that the plurality of jigs are arranged in line symmetry with respect to the folding centerline.

Also, it is more preferred that the plurality of drive mechanisms are constituted to rotate only an outermost jig among the plurality of jigs arranged in the left-side and the right-side.

It is further preferred that the plurality of drive mechanisms are constituted to linearly move an outermost jig and a jig next to the outermost jig among the plurality of jigs arranged in the left-side and the right-side.

It is still further preferred that the plurality of jigs have concave grooves for accommodating the wire rod, respectively, and that the concave grooves of the plurality of jigs are arranged in linear each other at an initial state before bending.

According to the present invention, further, a coil segment forming method includes a step of supporting a linear wire rod by a plurality of jigs arranged in the same plane, and a step of bending the wire rod into a predetermined shape consisting of a pair of slot insertion portions that are substantially parallel to each other and a linking portion for connecting the pair of slot insertion portion. The bending is performed by moving a plurality of drive mechanisms based on moving amounts respectively set depending on shape conditions of a coil segment to be formed.

The jigs are moved based on moving amounts set depending on shape conditions of the coil segment to be formed, in other words, moving amounts of the jigs are set for each coil segment. Thus, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since the wire rod can be bent to a desired shape by the plurality of jigs without using the press die, any scratch on the insulation layer of the wire rod due to the contact with the surface of the press die will never be occurred. Still further, because moving amounts of the jigs can be set for each coil segment to be formed, it is not necessary to form previously and to stock many coil segments with various kinds of shape, the management of the stocked coil segments with various kinds of shape becomes needless. Coil segments with various kinds of shape can be easily formed each time when necessary.

According to the present invention, still further, a manufacturing apparatus of an electrical rotating machine includes a first bending section for bending in the same plane a linear wire rod into a predetermined shape consisting of a pair of slot insertion portions that are substantially parallel to each other and a linking portion for connecting the pair of slot insertion portions. The first bending section has a plurality of jigs arranged on the same plane for supporting the wire rod, and a plurality of drive mechanisms for moving respectively the plurality of jigs on the same plane based on moving amounts respectively set depending on shape conditions of the coil segment to be formed. The manufacturing apparatus of an electrical rotating machine may have a wire rod providing section for supplying a wire rod, a first bending section for bending in the same plane a linear wire rod supplied from the wire rod providing section into a predetermined shape consisting of a pair of slot insertion portions that are substantially parallel to each other and a linking portion for connecting the pair of slot insertion portions, a second bending section for bending the wire rod bent by the first bending section in a plane perpendicular to the same plane, and a coil assembling section for assembling coil segments bent by the second bending section in line with slots circularly arranged along a circumferential direction of the electrical rotary machine.

The jigs are moved based on moving amounts set depending on shape conditions of the coil segment to be formed, in other words, moving amounts of the jigs are set for each coil segment. Thus, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since the wire rod can be bent to a desired shape by the plurality of jigs without using the press die, any scratch on the insulation layer of the wire rod due to the contact with the surface of the press die will never be occurred. Still further, because moving amounts of the jigs can be set for each coil segment to be formed, it is not necessary to form previously and to stock many coil segments with various kinds of shape, the management of the stocked coil segments with various kinds of shape becomes needless. Coil segments with various kinds of shape can be easily formed each time when necessary.

It is preferred that the plurality of drive mechanisms are constituted to rotate or linearly move the plurality of jigs based on set data of the moving amounts, respectively. Preferably, the plurality of drive mechanisms are constituted to rotate or linearly move the plurality of jigs based on set data of rotating angles or moving distances, respectively.

It is further preferred that the plurality of jigs are arranged with the equal number to each other in left-side and right-side of a bending centerline of the first bending section, and the plurality of jigs arranged in the left-side and the right-side are supported respectively by a pair of base members arranged in the left-side and the right-side, and that the plurality of drive mechanisms are constituted to rotate the pair of base members around a point located on the bending centerline as a turning center.

In this case, it is preferred that the plurality of jigs are arranged in line symmetry with respect to the folding centerline.

It is further preferred that the plurality of drive mechanisms are constituted to rotate only an outermost jig among the plurality of jigs arranged in the left-side and the right-side.

It is still further preferred that the plurality of drive mechanisms are constituted to linearly move an outermost jig and a jig next to the outermost jig among the plurality of jigs arranged in the left-side and the right-side.

It is further preferred that the plurality of jigs have concave grooves for accommodating the wire rod, respectively, and that the concave grooves of the plurality of jigs are arranged in linear each other at an initial state before bending.

Effect of the Invention

According to the present invention, since no press die having a shape similar to the target shape is necessary to use even when coil segments having various shapes are to be fabricated, the manufacturing cost becomes cheap. Also, since any die exchange is needless for forming coil segments of various kinds of shape, no downtime due to the die exchange occurs resulting that shortening in working hours can be expected and the work itself becomes easy and assured. As a result, working efficiency of the whole works for forming the coil segment can be extremely improved. Further, since the wire rod can be bent to a desired shape by the plurality of jigs without using the press die, any scratch on the insulation layer of the wire rod due to the contact with the surface of the press die will never be occurred. Still further, because moving amounts of the jigs can be set for each coil segment to be formed, it is not necessary to form previously and to stock many coil segments with various kinds of shape, the management of the stocked coil segments with various kinds of shape becomes needless. Coil segments with various kinds of shape can be easily formed each time when necessary.

EMBODIMENTS FOR CARRYING OUT THE INVENTION

Hereinafter embodiments of the present invention will be described with reference to the drawings. In the following embodiments, a rectangular wire with a quadrangular cross-section will be used as for a wire rod. However, a single line wire or a stranded line wire with any shaped cross-section such as for example a circular-shaped cross-section, a square-shaped cross-section, a polygonal-shaped cross-section or other-shaped cross-section may be applicable as for the wire rod, according to the present invention.

Figure 1:
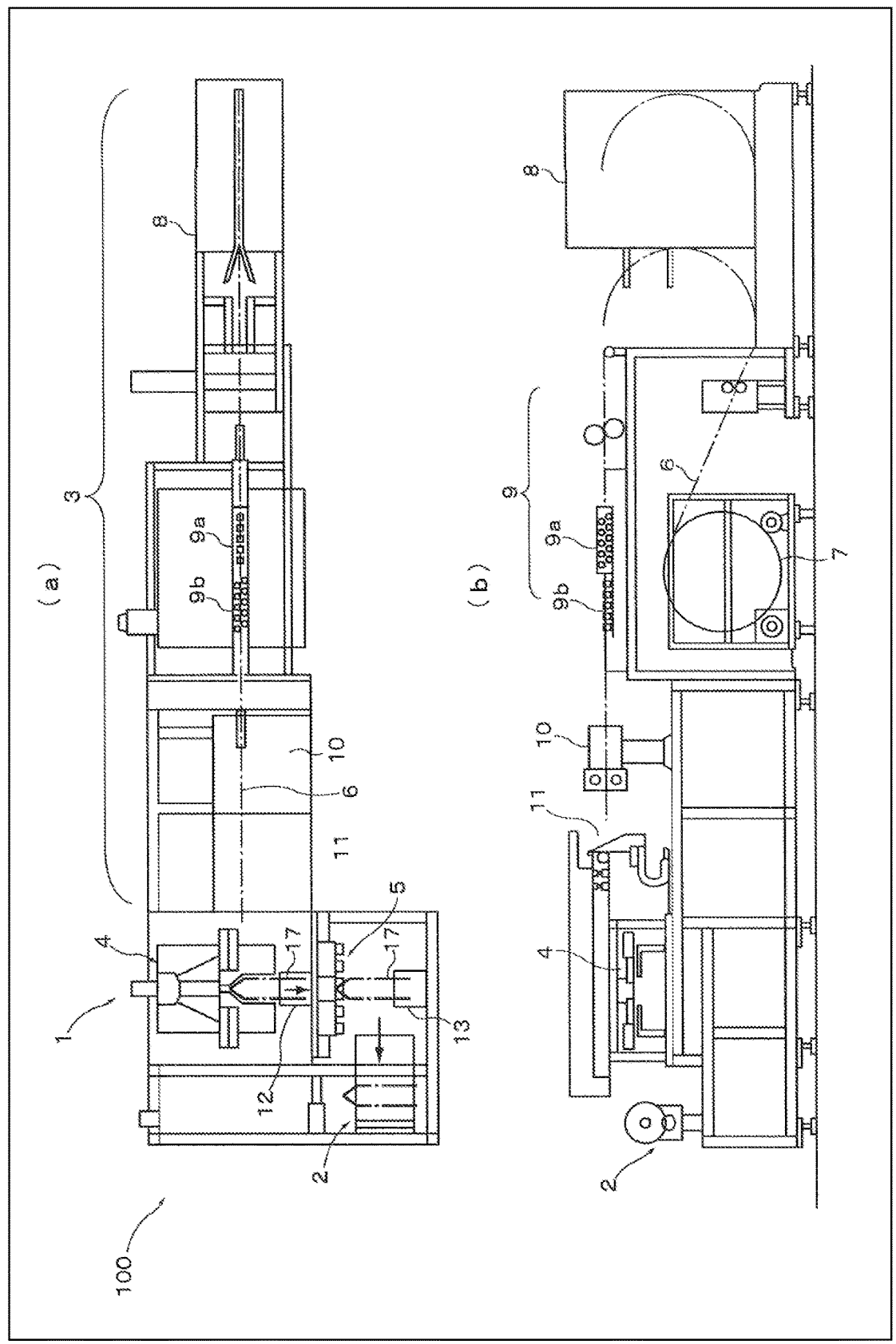
FIG. 1 is views schematically illustrating a partial constitution of a manufacturing apparatus of an electrical rotating machine in an embodiment according to the present invention, in which (a) shows a plane view and (b) shows a side view.

As shown in FIG. 1, a manufacturing apparatus 100 of an electrical rotary machine of this embodiment has a coil segment forming apparatus 1, and a coil assembling section 2 for assembling coil segments formed in the coil segment forming apparatus 1 in line with slots circularly arranged along the circumferential direction of the electrical rotary machine. The coil segment forming apparatus 1 has a wire rod providing section 3, a first bending section 4 and a second bending section 5. The first bending section 4 bends a separated linear wire rod with a predetermined length, supplied from the wire rod providing section 3, into a predetermined shape (U shape for example) in the same plane (in a horizontal plane in this embodiment). The second bending section 5 bends a coil segment (first bent body) bent in the first bending section 4 in a plane (in a perpendicular plane in this embodiment) perpendicular to the axis of the coil segment and to the above-mentioned same plane. Also, the second bending section 5 provides a special shape (crank shape) to the top end portion of the coil segment in order to shift or misalign a slot insertion portion of the coil segment in a radial direction of the core.

The wire rod providing section 3 has a bobbin 7 on which a continuous wire rod 6 of a rectangular wire with the surface coated by an insulation layer is wound, a feed direction switching section 8 for drawing the continuous wire rod 6 from the bobbin 7 and for changing its feed direction, a corrective transporting section 9 including a plurality of roller pairs 9a for pinching the flatwise side of the continuous wire rod 6 to transport the pinched wire rod and a plurality of roller pairs 9b for pinching the edgewise side of the continuous wire rod 6 to transport the pinched wire rod, for correcting a longitudinal distortion of the wire rod, a peeling section 10 for stripping the insulation layer coated around the distortion-corrected wire rod 6, in which peeling areas are located at both end portions of the wire rod to keep a predetermined distance with each other, and a cutting section 11 for cutting the continuous wire rod 6 passed through the peeling section 10 at positions located along the wire rod to keep the predetermined distance with each other into separated wire rods. The peeling section 10 in this embodiment has a configuration to strip the coated insulation layer by a laser beam. A peeling area stripped by the peeling section 10 includes respective two areas of the separated wire rod and the neighbor separated wire rod. Thus, the cutting section 11 is constituted to cut the continuous wire rod 6 at the center position of the peeling area. Note that, as for the peeling section 10, any constitution to strip the coated insulation layer using mechanical cutting or clipping may be utilized other than that using a laser beam.

The separated wire rod 6 bent by the first bending section 4, that is, a U-shaped first bent body is transferred to the second bending section 5 by means of a feed mechanism 12 located between the first bending section 4 and the second bending section 5. The feed mechanism 12 has a pair of chucking portions (not shown) formed by air cylinders. The pair of chucking portions will be waiting in the state where their chuck pieces are open to cover the region into which both leg parts (a pair of slot insertion portions) of the first bent body are turned by the bending. After the chucking portions grip the both leg parts of the first bent body, the feed mechanism 12 moves upward to detach the first bent body from the first bending section 4 and then transfers the first bent body to the second bending section 5. The end portions of the both leg parts of the first bent body transferred by means of the feed mechanism 12 are then held by a hold member 13. After the first bent body is delivered to the hold member 13, the feed mechanism 12 backs away so that the coil end portion (linking portion) of the first bent body becomes free. Under this state, bending operation including bending operation for forming a step shape (a crank shape) in the coil end portion of the first bent body is performed by the second bending section 5. In the configuration shown in FIG. 1, the feed direction switching section 8, the corrective transporting section 9, the peeling section 10 and the cutting section 11 in the wire rod providing section 3, and the first bending section 4 are aligned along the lateral direction in FIG. 1 (a), the second binding section 5 is arranged along the perpendicular direction with respect to the first bending section 4 (the longitudinal direction in FIG. 1 (a)), and the coil assembling section 2 is arranged along the perpendicular direction with respect to the second bending section 5 (lateral direction in FIG. 1 (a)). However, the feed direction switching section 8, the corrective transporting section 9, the peeling section 10, the cutting section 11, the first bending section 4, the second binding section 5 and the coil assembling section 2 may be aligned along the lateral direction in FIG. 1 (a). That is, there is no limitation in the arrangement of the coil segment forming section and the coil assembling section, in other words, there is no limitation in the layout if the coil formation concludes in a single manufacturing apparatus.

Hereinafter, configurations and bending operations of the first bending section 4 will be described in detail.

Figure 2:
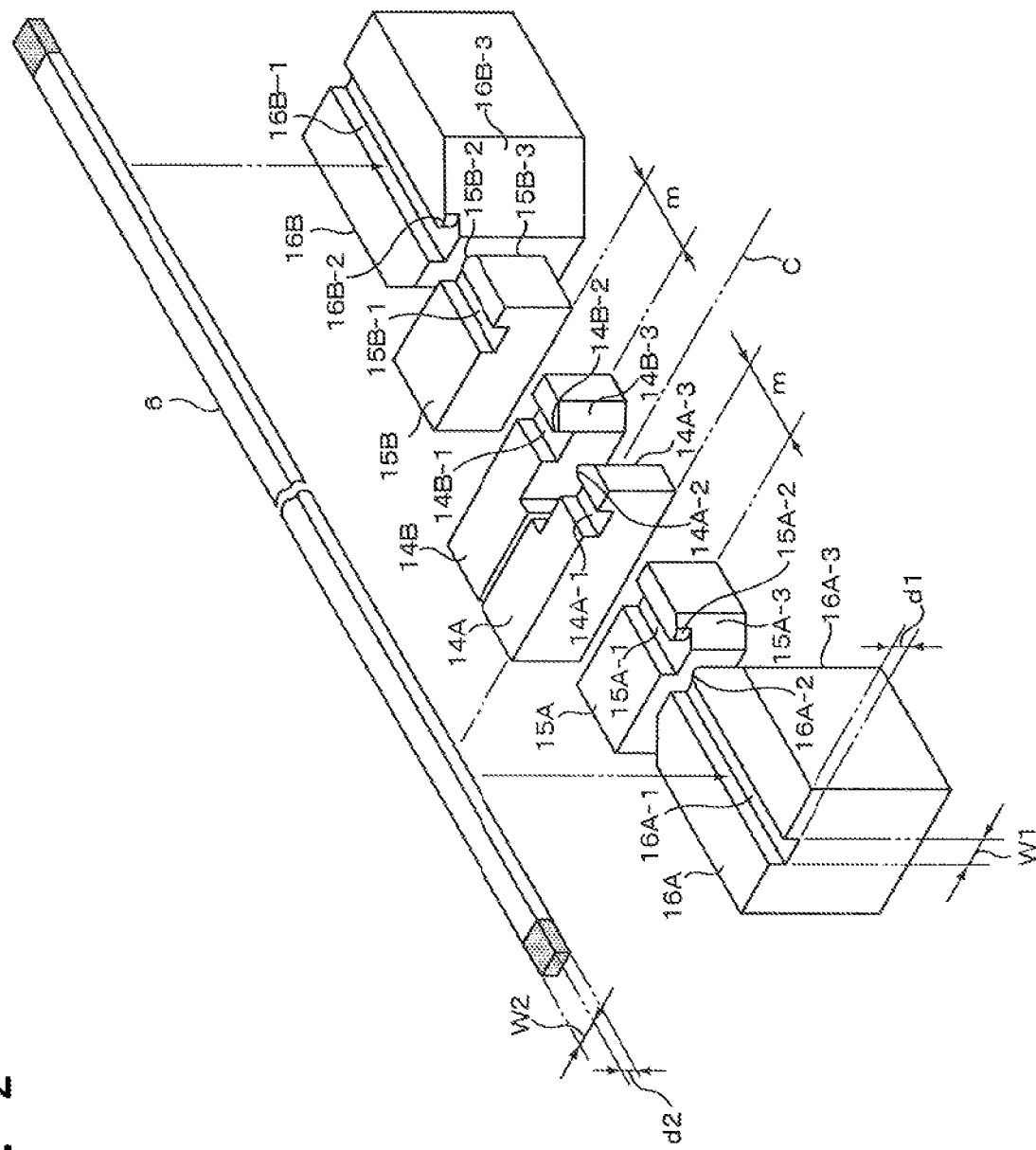
FIG. 2 is an essential part perspective view schematically illustrating initial state relationship between jigs and a wire rod in a first bending section of a coil segment forming apparatus in the embodiment of FIG. 1.

The first bending section 4 has as shown in FIG. 2 a plurality of (in this case six) block-shaped jigs 14A, 14B, 15A, 15B, 16A and 16B provided with respective concave grooves for supporting the linear wire rod 6 with the predetermined length. The insulation layer of the both end portions of the wire rod 6 was stripped or peeled. In the figure, the peeled portions at the both ends of the wire rod 6 are presented as dot areas. Rotary movement or linear movement of these jigs 14A, 14B, 15A, 15B, 16A and 16B are controlled by numerical control (NC control) based on the set control data, respectively. It should be noted that "the rotary movement" in this description indicates a rotating (turning) movement around the rotation center (turning center).

Figure 3:
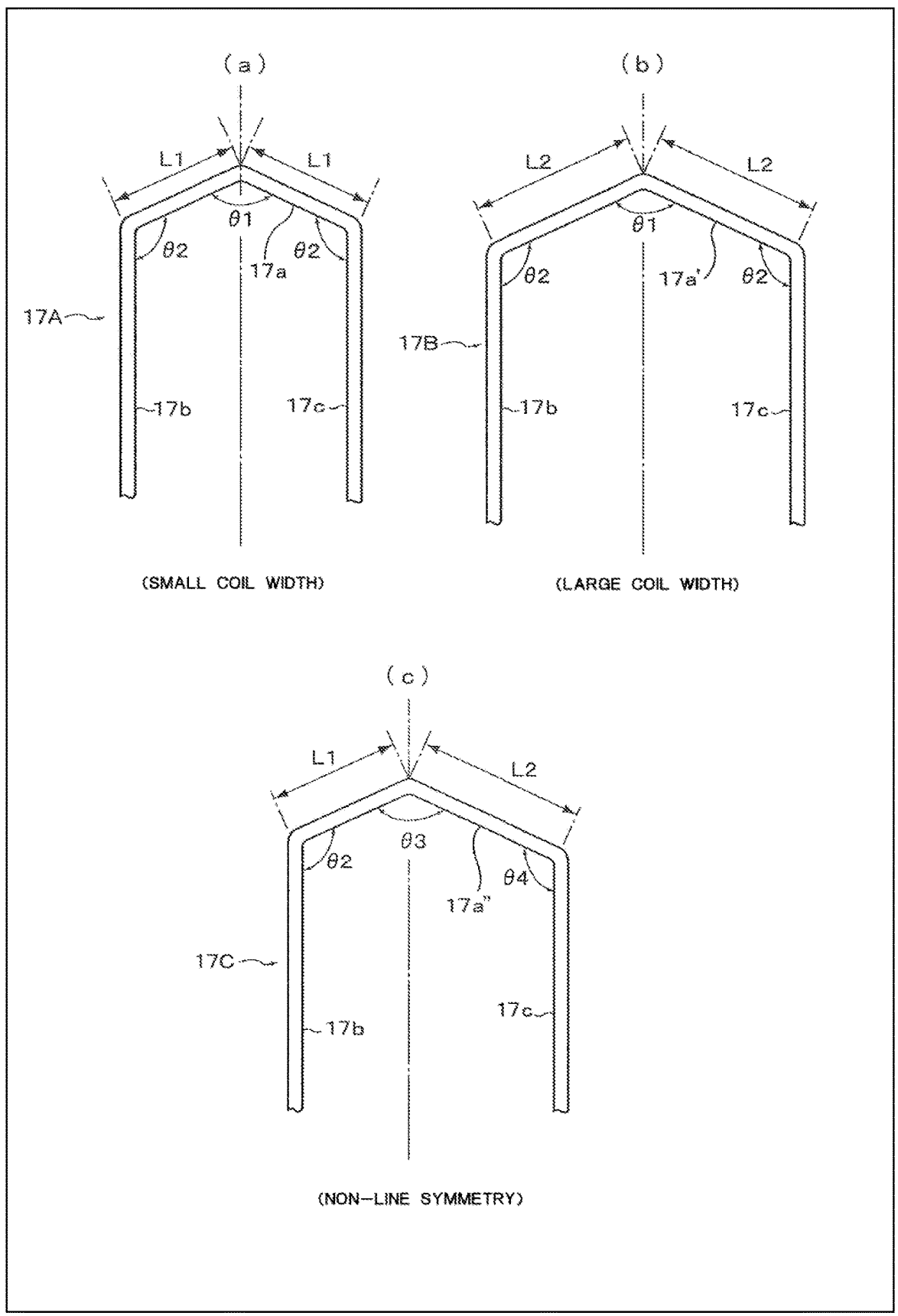
FIG. 3 is views illustrating shapes of first bent bodies formed in the first bending section in the embodiment of FIG. 1, in which (a) shows the first bent body with a small coil width, (b) shows the first bent body with a large coil width, and (c) shows the first bent body with a non-line symmetric shape.

In this embodiment, at the first bending section 4, the linear wire rod 6 is bent in the same plane to form the U-shape shown in FIG. 3 (a) and thus the first bent body 17A of the coil segment is obtained. The first bent body 17A consists of a linking portion 17a having a chevron shape with an apex angle (hereinafter called as a central angle) of $\theta1$, and a pair of slot insertion portions 17b and 17c each connected to the linking portion 17a with an angle (hereinafter called as a shoulder angle) of $\theta2$ and extending substantially in parallel with each other. The linking portion 17a and the pair of slot insertion portions 17b and 17c are formed in the same plane. This first bent body 17A is a small coil width example in which each side of the linking portion 17a has a small length of L1.

The jigs 14A, 14B, 15A, 15B, 16A and 16B in this embodiment are arranged as shown in FIG. 2 in line symmetry with respect to the folding centerline C (bending centerline) of the first bending section 4, in other words, with respect to the center position of the wire rod 6 along its axis. These jigs of the equal number (three in this case) to each other are arranged in left-side and right-side of the folding centerline. The pair of jigs 14A and 14B arranged at the most inner side with respect to the folding centerline C (innermost jigs) are configured to provide, by its rotation (rotational movement), the folding of the center angle of $\theta1$ to the linking portion 17a of the first bent body 17A. In practice, the pair of jigs 15A and 15B and the pair of jigs 16A and 16B rotate together with the rotation of the pair of jigs 14A and 14B. On the other hand, the pair of jigs 16A and 16B arranged at the most outer side with respect to the folding centerline C (outermost jigs) and the pair of jigs 15A and 15B arranged next to the respective outermost jigs 16A and 16B are configured to provide, by their relative rotation (relative rotational movement), the folding of the shoulder angle of $\theta2$ to the first bent body 17A. The coil width determined by the length L1 of each side of the linking portion 17a of the first bent body 17A shown in FIG. 3 (a) is defined by a distance m between the jigs 14A and 15A and a distance m between the jigs 14B and 15B.

As shown in FIG. 2, the jigs 14A, 14B, 15A, 15B, 16A and 16B have concave grooves 14A-1, 14B-1, 15A-1, 15B-1, 16A-1 and 16B-1 with opened top surfaces and laterally penetrated-through sides, respectively. The width w1 of each concave groove is set to slightly larger than the width (width of the edgewise direction) w2 of the wire rod 6 of the rectangular wire. Thus, the wire rod 6 is certainly supported by the concave grooves of the jigs 14A, 14B, 15A, 15B, 16A and 16B during the bending operation to the edgewise direction. Configuration of each jig for supporting the wire rod 6 is not limited to a particular shape, but in this embodiment, each jig has a concave groove so that the wire rod 6 is inserted into the concave groove to restrict its movement in the bending direction. The depth d1 of each concave groove is set equal to or larger than the thickness (width in flatwise direction) d2 of the wire rod 6. The width w1 of each concave groove is set so that the wire rod 6 can be closely inserted and supported by the concave groove to improve the dimensional precision of the first bent body 17A. Since the width w1 is not variable but fixed, if it is necessary to change the width w2 of the wire rod 6 depending on the kind of the coil, the jigs 14A, 14B, 15A, 15B, 16A and 16B have to be changed. Therefore, these jigs 14A, 14B, 15A, 15B, 16A and 16B are detachably fixed to a support member described below by using fixing screws.

In the initial state before the bending operation of the first bending section 4 is started, the concave grooves 14A-1, 14B-1, 15A-1, 15B-1, 16A-1 and 16B-1 of these jigs 14A, 14B, 15A, 15B, 16A and 16B are aligned on a straight line with each other as shown in FIG. 2. That is, the jigs 14A, 14B, 15A, 15B, 16A and 16B shown in this figure are in the initial position.

As shown in FIG. 2, edges 14A-2, 14B-2, 15A-2, 15B-2, 16A-2 and 16B-2 of the concave grooves 14A-1, 14B-1, 15A-1, 15B-1, 16A-1 and 16B-1 of these jigs 14A, 14B, 15A, 15B, 16A and 16B that will be in contact with the edgewise side surface of the wire rod 6 are formed to have curved surfaces so as to not scratch the insulation layer of the wire rod 6 by their sharp corners during the bending operation. Also, chamfering parts 14A-3, 14B-3, 15A-3, 15B-3, 16A-3 and 16B-3 are formed on the outside surface of the jigs 14A, 14B, 15A, 15B, 16A and 16B to avoid occurrence of any interference with other jigs by their displacements during the bending operation, respectively. According the conventional bending method where the wire rod was pressed by a pair of forming dies having a fixed press surface corresponding to the desired bending shape, because the both surfaces or the whole surface of the wire rod received the press pressure, the insulation layer of the wire rod was easily bruised. That is, because the edge of the press surface of the press dies would sharpen in order to improve the bending precision and thus the stress was concentrated at the edge, the insulation layer was easily damaged. In the conventional bending method using the press dies with the fixed press surface, it was impossible to know whether the insulation layer would be damaged or not until the wire rod was really pressed by the press dies. In case that the problem was occurred, it was necessary to fabricate another press dies causing increase in cost for the bending. Whereas in this embodiment, since it is the bending in the open system where the wire rod 6 is inserted in the concave grooves of the jigs, any scratch on the insulation layer of the wire rod will never be occurred.

It should be noted that, although in the above-mentioned description, the jigs 14A, 14B, 15A, 15B, 16A and 16B have the concave grooves 14A-1, 14B-1, 15A-1, 15B-1, 16A-1 and 16B-1 with the opened top surfaces and the laterally penetrated-through sides, respectively, and that the wire rod 6 is inserted into these concave grooves from the upper side, another configuration in which the wire rod 6 is inserted into the concave grooves from their lateral sides may be adopted. In the above-mentioned description, also, the wire rod 6 is caught and supported by the concave grooves with the opened top surfaces during the bending operation. However, the jigs of the segment forming apparatus according to the present invention are not limited to this configuration. For example, the jigs may be formed by stacking pairs of jigs to have a via hole for passing the wire rod 6 there through. The wire rod 6 will be passed through the via hole from the lateral direction, and then the bending operation of the wire rod will be performed. After the first bending operation is performed, each jig will be separated into individual top and bottom jigs to release the first bent body.

Hereinafter, the first bending operation of the wire rod 6 in the first bending section 4 will be described in detail. First, the linear wire rod 6 having a predetermined length is inserted from the upper side into the concave grooves, aligned in a straight line, of the jigs 14A, 14B, 15A, 15B, 16A and 16B, and is supported by these jigs in a bridging state. Then, bending operation by the first bending section 4 is started.

Figure 4:
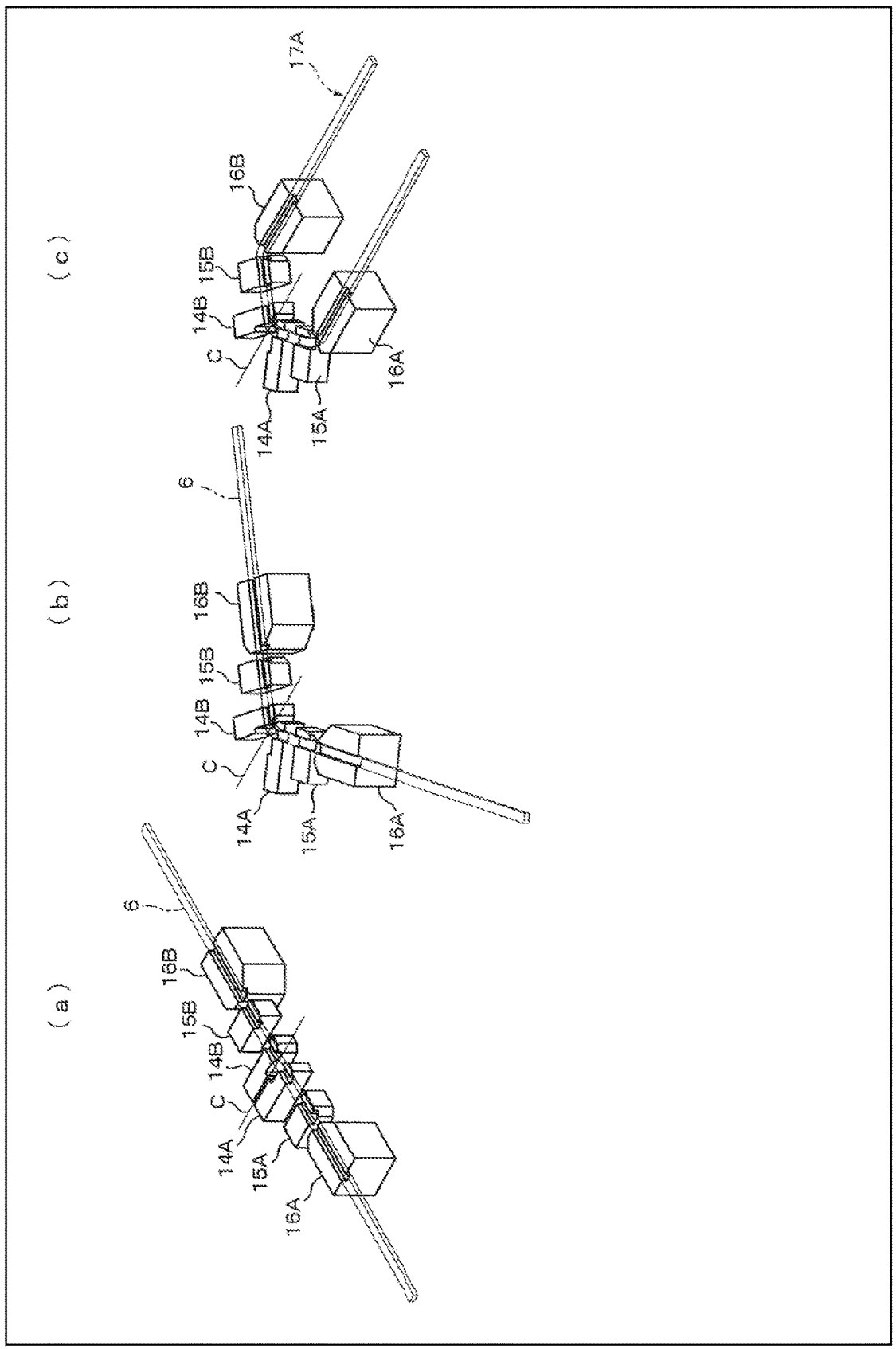
FIG. 4 is an essential part perspective view illustrating, in stages, first bending operation of the wire rod in the embodiment of FIG. 1.

FIG. 4 schematically illustrates this bending operation performed by the first bending section 4. FIG. 4 (a) shows the state where the wire rod 6 is set in the concave grooves aligned in a straight line, of the jigs 14A, 14B, 15A, 15B, 16A and 16B, and is supported by these jigs in the bridging state. First bending of the wire rod 6 is performed as shown in FIG. 4 (b) by rotating and moving the jigs 14A, 14B, 15A, 15B, 16A and 16B from this state, and then second bending is performed to finally provide the first bent body 17A with the U-shape as shown in FIG. 4 (c).

As aforementioned, in this embodiment, the six jigs 14A, 14B, 15A, 15B, 16A and 16B are arranged in symmetry with respect to the bending centerline C, and each pair of the jigs located at the line-symmetric positions rotates and moves in line-symmetric manner in response to control data. As a result, the first bent body 17A formed in the first bending section 4 of this embodiment has the U-shape in the line-symmetry as shown in FIG. 3 (a). It is possible to form a first bent body with various kinds of shape by modifying the control data to change the rotating angle or the moving linear distance of the jigs 14A, 14B, 15A, 15B, 16A and 16B. For example, if the second bending is performed under the conditions where the pair of outermost jigs 16A and 16B and the pair of jigs 15A and 15B next to the outermost jigs 16A and 16B are linearly moved in the direction leaving from the bending centerline C to increase the distance m between the jig 14A and the jig 15A and the distance m between the jig 14B and the jig 15B in the initial state before the bending or during the bending, a line-symmetrical first bent body 17B with a large coil width can be fabricated. As shown in FIG. 3 (b), the linking portion 17a' of this first bent body 17B consists of a pair of sides each having a length L2 that is longer than the length L1 of each side of the linking portion 17a shown in FIG. 3 (a) (L2>L1). Also, if the first bending is performed under the conditions where the rotational movement amount of the pair of jigs 14A and 14B is changed to obtain the center angle of θ3, and then if the second bending is performed under the conditions where only the pair of jigs 15B and 16B is linearly moved in the direction leaving from the bending centerline C to increase the distance m between the jig 14B and the jig 15B in the initial state before the bending or during the bending, a line-asymmetrical first bent body 17C can be fabricated. As shown in FIG. 3 (c), the linking portion 17a'' of this first bent body 17C has a center angle different from other first bent bodies and consists of a pair of sides having different length with each other. Therefore, according to this embodiment, various kinds of first bent bodies for the coil segments with various shapes can be promptly obtained without changing molding parts (jigs) by merely changing the amount of movement (control data) of the jigs 14A, 14B, 15A, 15B, 16A and 16B. As aforementioned, to fabricate a single coil of the rotating machine, it is necessary to fabricate plural kinds of coil segments with different shapes. However, according to this embodiment, only by providing a plurality of kinds of control data to the apparatus, each jig will automatically move and rotate in response to the control data read out to fabricate continually a plurality of kinds of coil segments (first bent bodies). Therefore, a plurality of kinds of coil segments (first bent bodies) that are necessary for forming a coil can be fabricated in a lump without performing stock management of the coil segments.

As mentioned above, according to this embodiment, the first bent bodies of the coil segments are formed only by rotationally moving or linearly moving in one plane (in horizontal plane), by NC control based on the control data, the plurality of simple block-shaped jigs 14A, 14B, 15A, 15B, 16A and 16B that do not have the similar shapes as the target shapes. Thus, according to this embodiment, since press dies having shapes similar to the target shapes respectively as in the conventional apparatus are not necessary to use but a plurality of NC-controlled dies are used, a large amount of die production expense is not necessary and the manufacturing cost of coil segments becomes cheap. Also, since any die exchange becomes needless for forming coil segments of various kinds of shape, no downtime due to the die exchange occurs resulting that shortening in working hours can be expected and the work itself becomes extremely easy.

Hereinafter, support structures and drive mechanisms of the jigs 14A, 14B, 15A, 15B, 16A and 16B will be described in detail.

Figure 5:
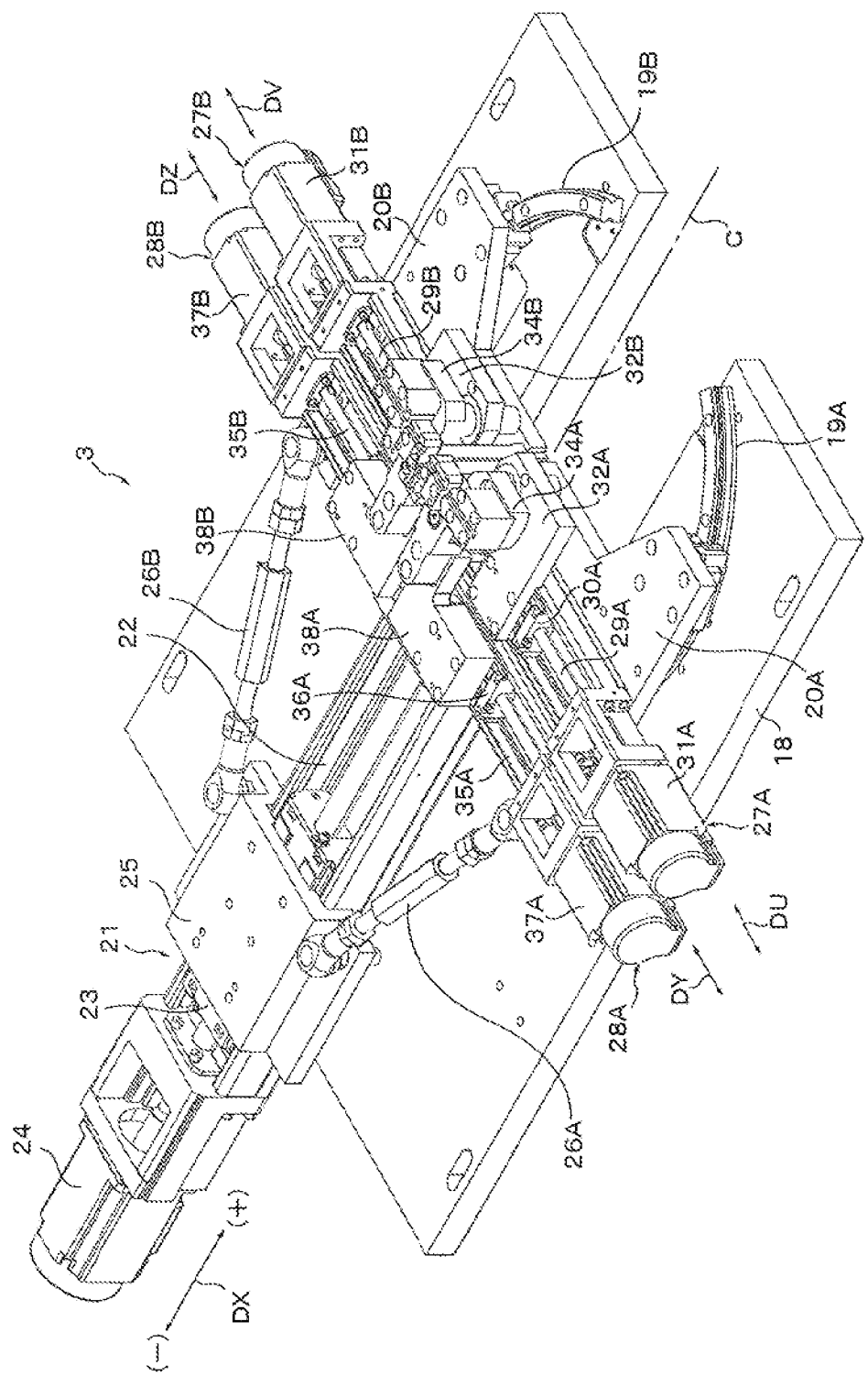
FIG. 5 is a perspective view illustrating an initial state of the first bending operation of the first bending section in the embodiment of FIG. 1.
Figure 6:
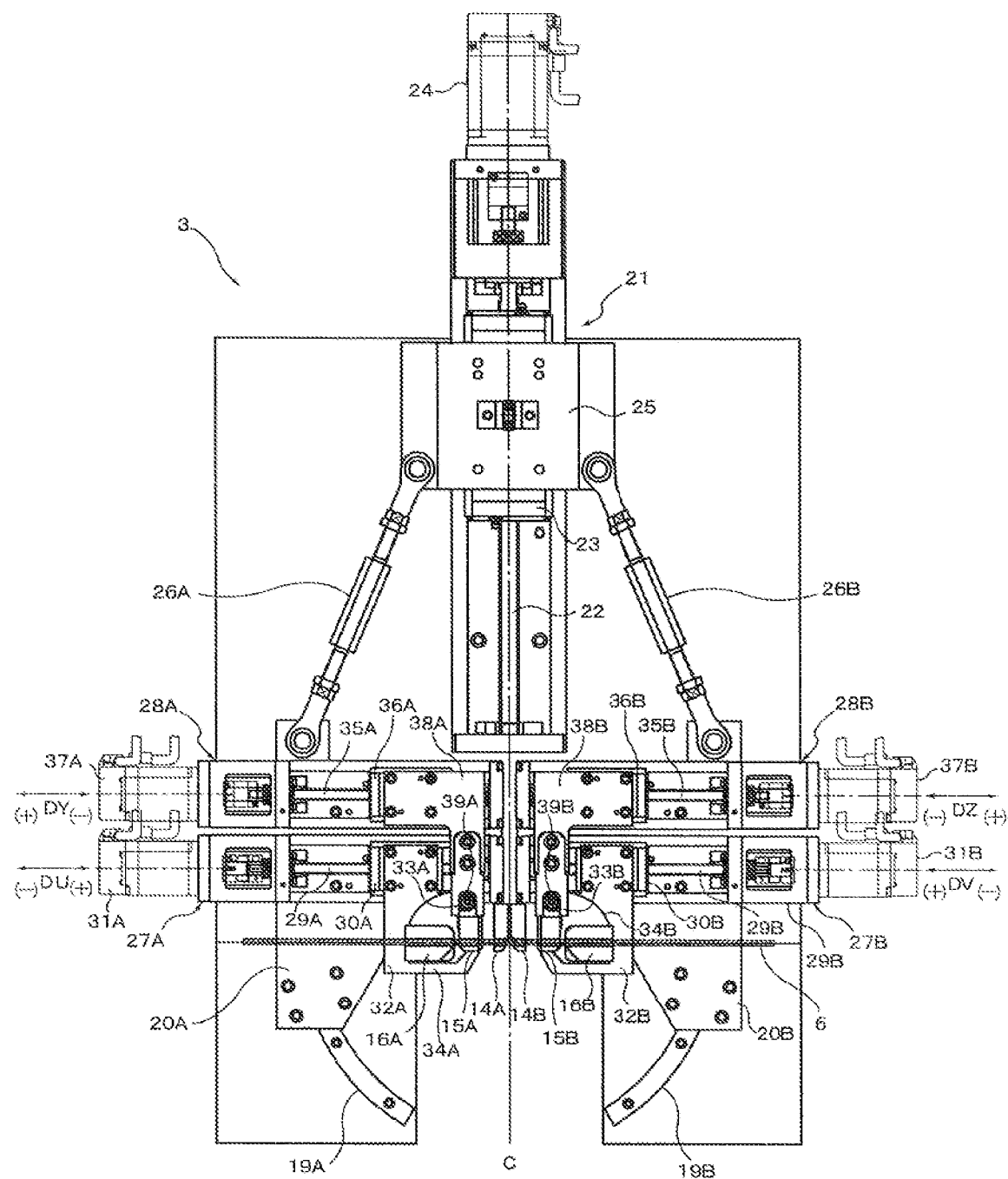
FIG. 6 is a plane view illustrating the initial state of the first bending operation of the first bending section in the embodiment of FIG. 1.

As shown in FIG. 5 and FIG. 6, the first bending section 4 has a fixed base 18 provided with a notched portion formed in the central part around the folding centerline C and in front (downward region in FIG. 6), a pair of arc-shaped guide rails 19A and 19B arranged and fixed to the front portion of the fixed base 18 in a linear symmetry with respect to the folding centerline C, movable bases 20A and 20B engaged with these guide rails 19A and 19B and slidably moved along the guide rails 19A and 19B, respectively, and a drive mechanism 21 for moving the movable bases 20A and 20B along the guide rails 19A and 19B, respectively.

The guide rails 19A and 19B are configured so that the center of the arc of these guide rails is located on a point of the folding centerline C.

The drive mechanism. 21 has a ball screw portion 22 provided with a rotation axis in the DX direction along the bending centerline C, a nut portion 23 threadably mounted on the ball screw portion 22 and slidable in the DX direction, a servomotor 24 for rotating the ball screw portion 22, a slider 25 fixed to the nut portion 23 and moving in the DX direction in response to the rotation of the ball screw portion 22, and arms 26A and 26B respectively coupled via rotatable joints between the slider 25 and the movable bases 20A and 20B. The rotatable joints of the arms 26A and 26B in the side of the movable bases 20A and 20B are located at the positions of connection axis 42A and 42B (see FIG. 7), respectively.

On the movable base 20A, a drive mechanism 27A provided with a rotation axis along the DU direction that is perpendicular to the DX direction, for linearly moving the jigs 15A and 16A so that the distance m between the jigs 15A and 14A can be changed, and a drive mechanism 28A provided with a rotation axis along the DY direction that is parallel to the rotation axis of the drive mechanism 27A for rotating the jig 16A. On the movable base 20B, a drive mechanism 27B provided with a rotation axis along the DV direction that is perpendicular to the DX direction, for linearly moving the jigs 15B and 16B so that the distance m between the jigs 15B and 14B can be changed, and a drive mechanism 28B provided with a rotation axis along the DZ direction that is parallel to the rotation axis of the drive mechanism 27B for rotating the jig 16B.

The drive mechanism 27A has a ball screw portion 29A provided with a rotation axis in the DU direction, a nut portion 30A threadably mounted on the ball screw portion 29A and slidable in the DU direction, a servomotor 31A for rotating the ball screw portion 29A, and a slide plate 32A fixed to the nut portion 30A and moved in the DU direction in response to the rotation of the ball screw portion 29A. The jig 15A is fixed to this slide plate 32A. A turning plate 34A provided with a cam follower 33A is axially supported by this slider plate 32A so that this turning plate 34A can turn. The jig 16A is fixed to this turning plate 34A. The drive mechanism 28A has a ball screw portion 35A provided with a rotation axis in the DY direction, a nut portion 36A threadably mounted on the ball screw portion 35A and slidable in the DY direction, a servomotor 37A for rotating the ball screw portion 35A, and a turning drive plate 38A fixed to the nut portion 36A and moved in the DY direction in response to the rotation of the ball screw portion 35A. The turning drive plate 38A has an engagement concave portion 39A that is engaged with the cam follower 33A.

The drive mechanism 27B has a ball screw portion 29B provided with a rotation axis in the DV direction, a nut portion 30B threadably mounted on the ball screw portion 29B and slidable in the DV direction, a servomotor 31B for rotating the ball screw portion 29B, and a slide plate 32B fixed to the nut portion 30B and moved in the DV direction in response to the rotation of the ball screw portion 29B. The jig 15B is fixed to this slide plate 32B. A turning plate 34B provided with a cam follower 33B is axially supported by this slider plate 32B so that this turning plate 34B can turn. The jig 16B is fixed to this turning plate 34B. The drive mechanism 28B has a ball screw portion 35B provided with a rotation axis in the DZ direction, a nut portion 36B threadably mounted on the ball screw portion 35B and slidable in the DZ direction, a servomotor 37B for rotating the ball screw portion 35B, and a turning drive plate 38B fixed to the nut portion 36B and moved to the DZ direction in response to the rotation of the ball screw portion 35B. The turning drive plate 38B has an engagement concave portion 39B that is engaged with the cam follower 33B.

As mentioned above, the jigs 14A, 15A and 16A and the drive mechanisms 27A and 28A are mounted on the movable base 20A so as to rotate together with the rotation of this movable base 20A. Also, the jigs 14B, 15B and 16B and the drive mechanisms 27B and 28B are mounted on the movable base 20B so as to rotate together with the rotation of this movable base 20B.

Figure 7:
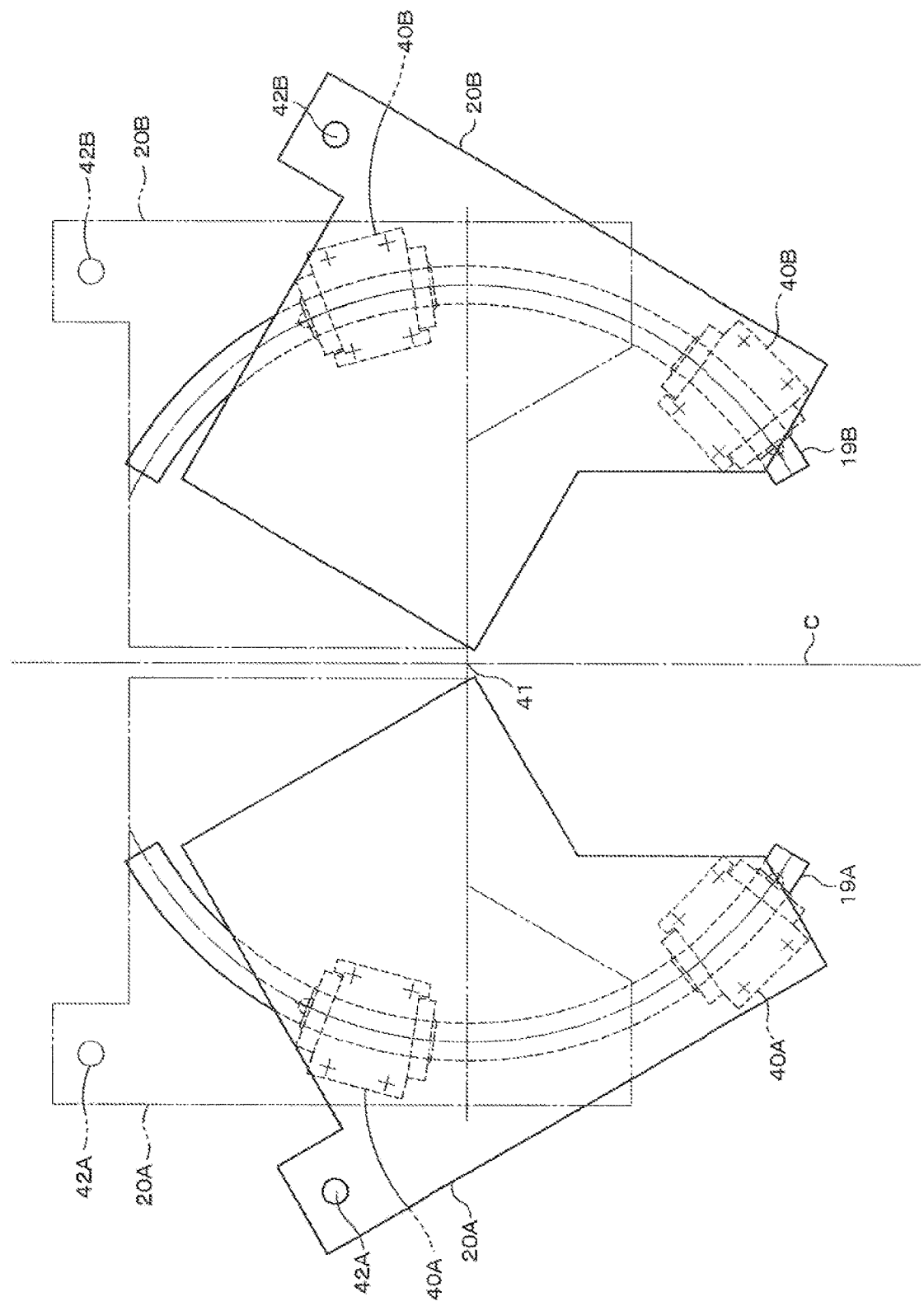
FIG. 7 is a plane view illustrating turning operation of a movable base along a guide rail in the embodiment of FIG. 1.
Figure 8:
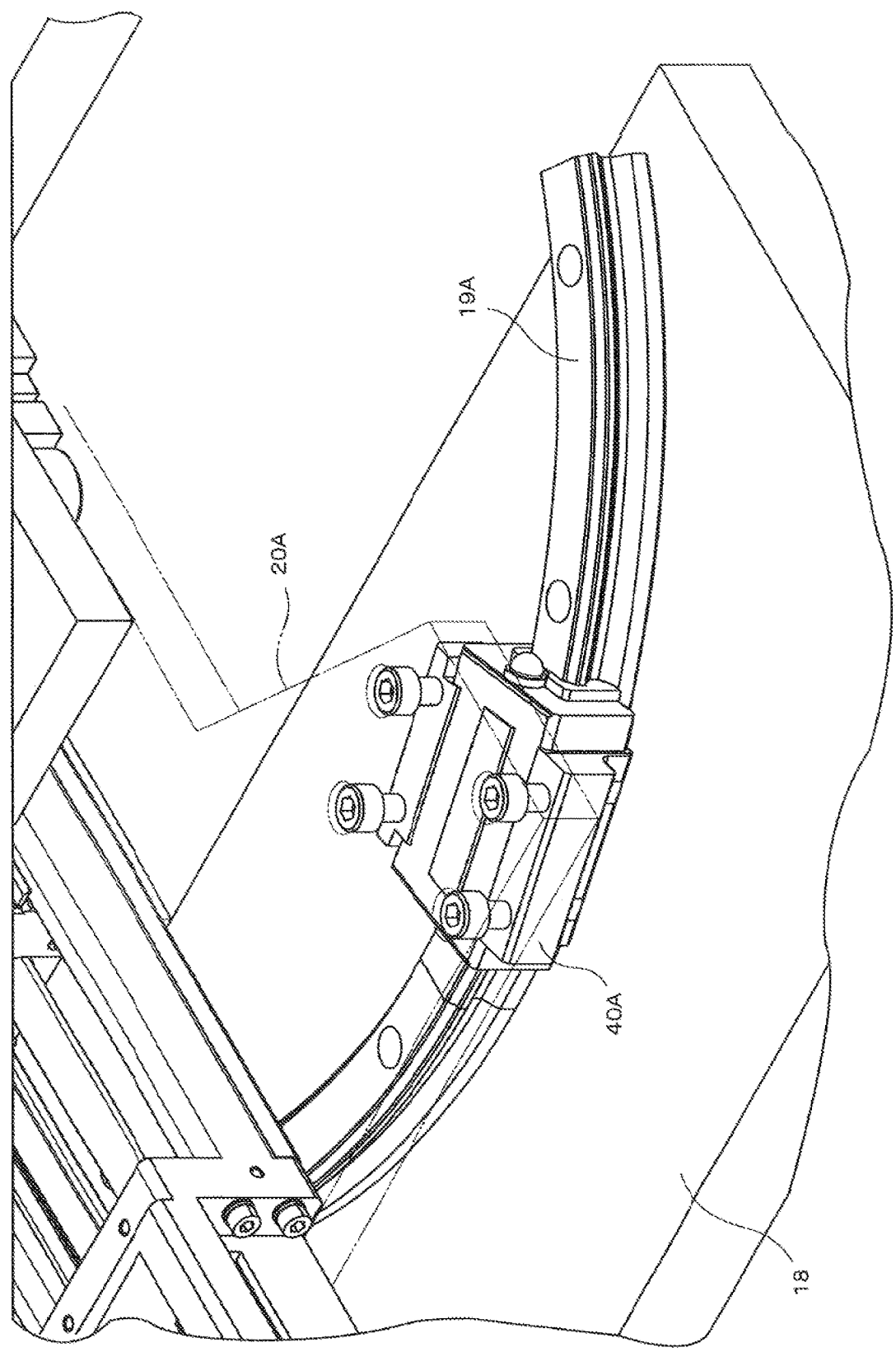
FIG. 8 is an essential part perspective view illustrating engaging structure between the guide rail and a fitting member of the movable base in the embodiment of FIG. 1.

As shown in FIG. 7, two fitting members 40A fitted with the guide rail 19A are attached to the lower surface of the movable base 20A at positions isolated to each other along the arc of this guide rail 19A by four screws. Also, two fitting members 40B fitted with the guide rail 19B are attached to the lower surface of the movable base 20B at positions isolated to each other along the arc of this guide rail 19B by four screws. In this embodiment, as shown in FIG. 8, the guide rail 19A is formed in a rail shape with a section having wide upper and lower parts, and each of the fitting members 40A is formed to fit the top and side surfaces of this guide rail 19A so as to slide along the guide rail 19A. Likewise each of the fitting members 40B is formed to have the similar structure to fit the guide rail 19B so as to slide along the guide rail 19B.

The center of the arc of the guide rails 19A and 19B, that is, the center of the rotation of the movable bases 20A and 20B, is as shown in FIG. 7 the turning center 41 that is a point located on the folding centerline C. In this embodiment, as aforementioned, the movable bases 20A and 20B turn by means of the configuration where the fitting members 40A and 40B of the movable bases 20A and 20B fit and slide along the guide rails 19A and 19b with the rail shape mounted on the fixed base 18. However, in a modification, the movable bases 20A and 20B may turn by means of the configuration where guide rails with concave grooves are mounted on the fixed base 18 and convex parts formed on the movable bases 20A and 20B may engage to these concave grooves, respectively.

Figure 9:
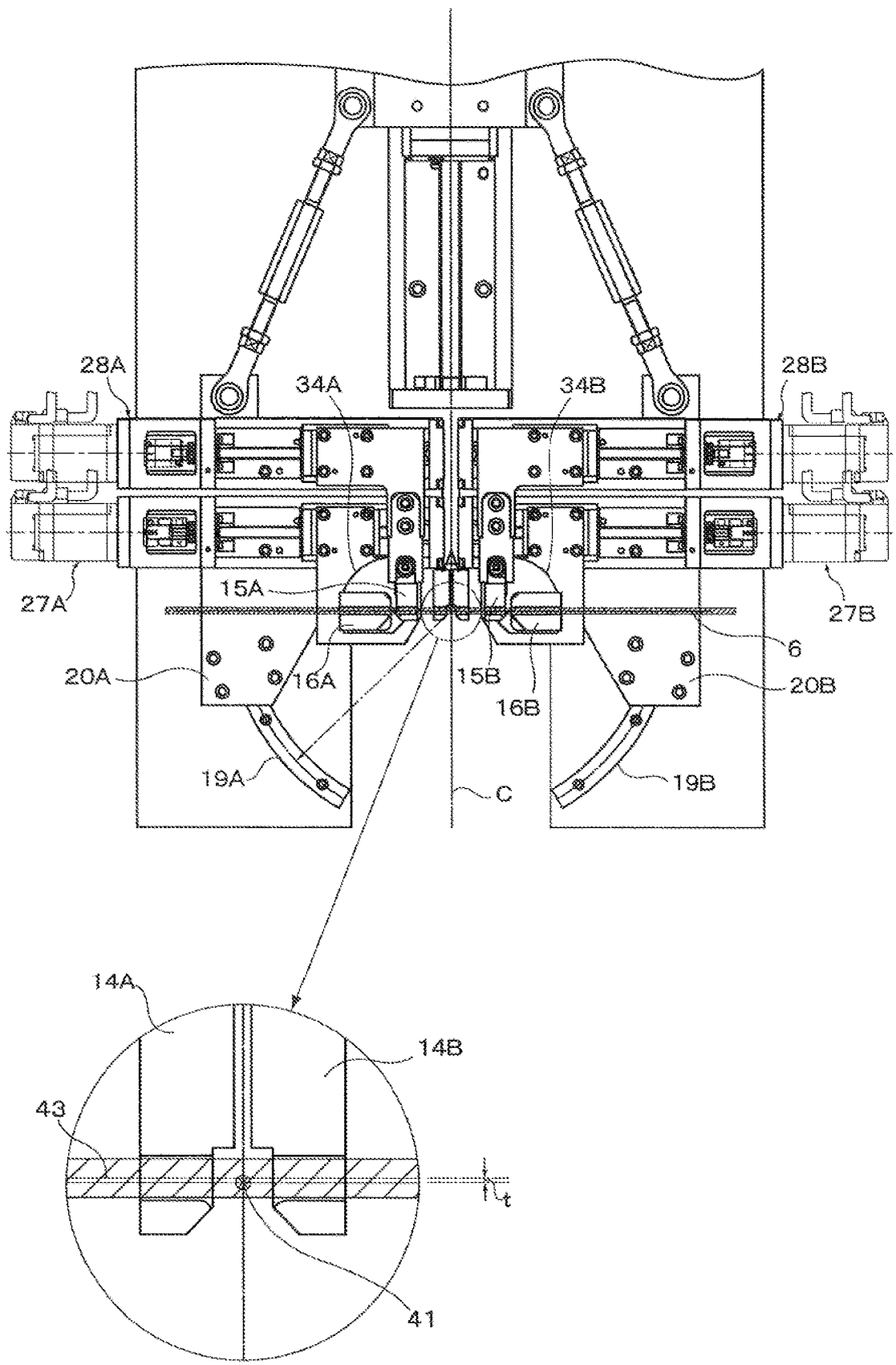
FIG. 9 is a plane view illustrating out of alignment of the turning center of the movable base from the center of the wire rod in the embodiment of FIG. 1.

The turning center 41 of the movable bases 20A and 20B is set as shown in FIG. 9 at a position on the folding centerline C, deviated from the centerline 43 of the wire rod 6 by a small distance t (for example, t=0.5 mm) toward the inner side of bending (downward in FIG. 9). When the wire rod 6 is bent to the edgewise direction, the expansion of the thickness occurs due to compression in the inner side of the bending and the contraction of the thickness occurs due to pulling in the outer side of the bending. Since this change of the thickness is bigger in the inner side of the bending than the outer side of the bending, the turning center 41 of the movable bases 20A and 20B is deviated toward the inner side of bending as mentioned above so as to minimize the expansion and contraction of the wire rod 6 by the bending.

Figure 10:
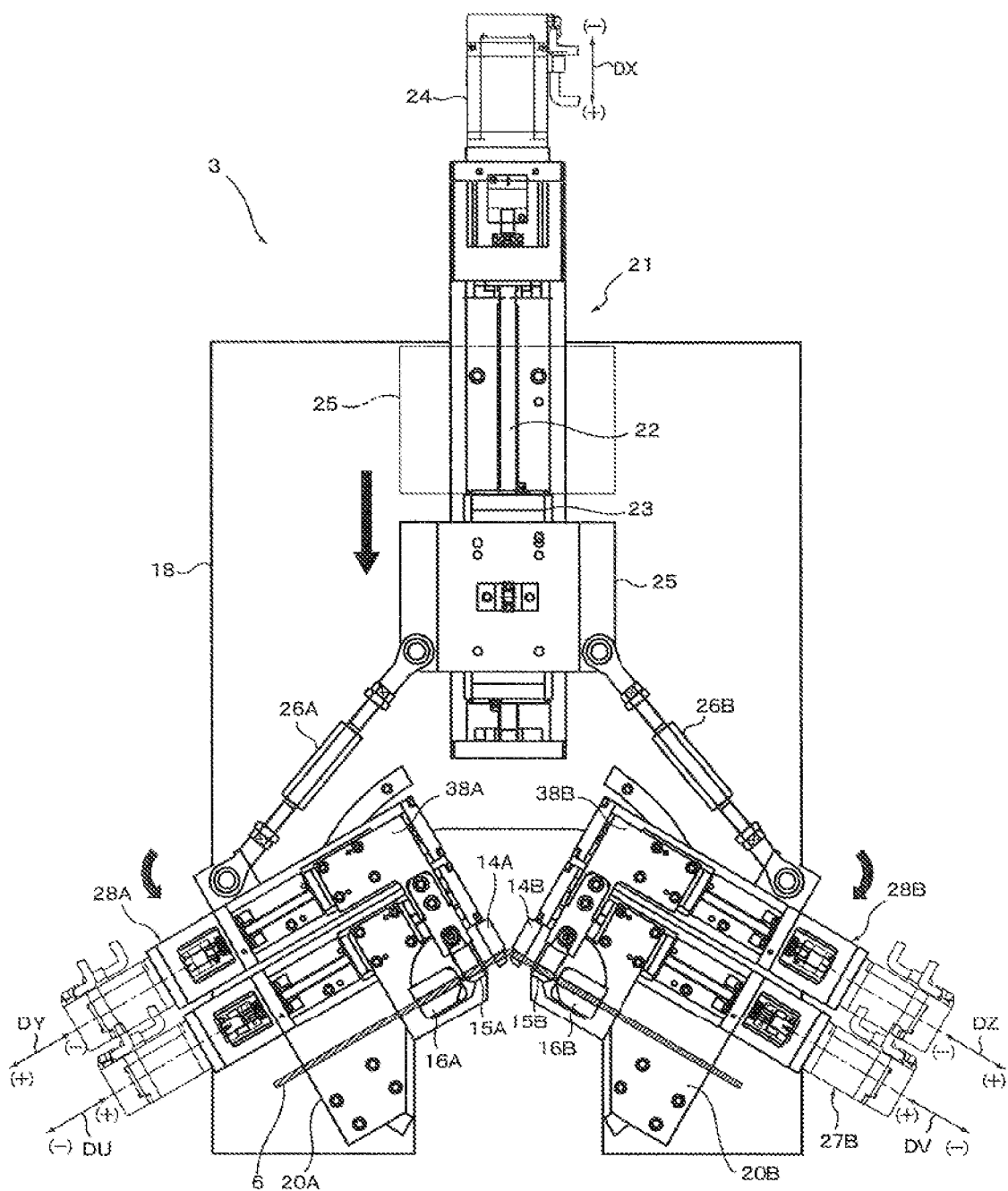
FIG. 10 is a plane view illustrating a halfway state of the first bending operation of the first bending section in the embodiment of FIG. 1.
Figure 11:
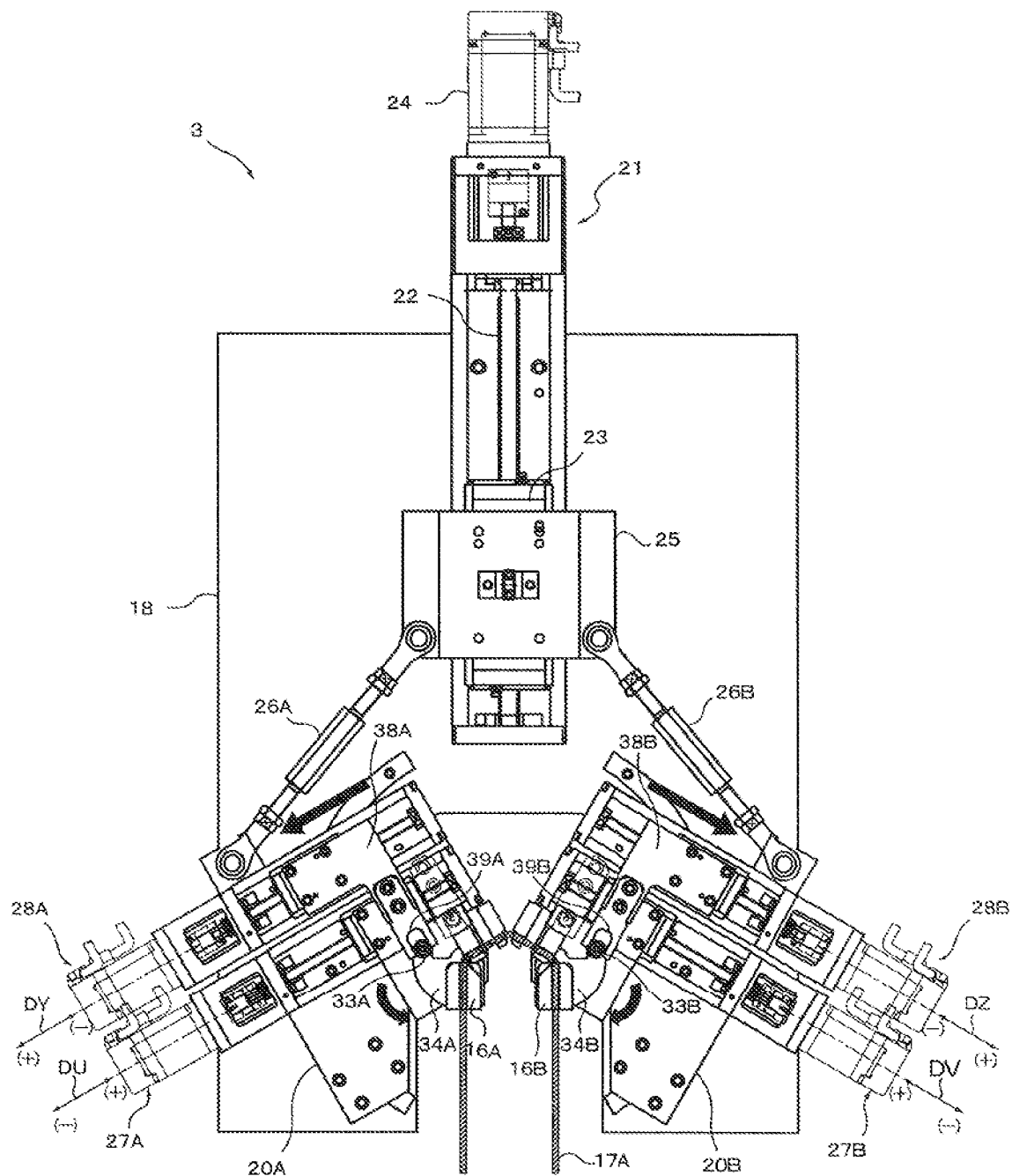
FIG. 11 is a plane view illustrating a complete state of the first bending operation of the first bending section in the embodiment of FIG. 1.

Hereinafter, bending operations of the first bending section 4 of this embodiment will be described with reference to FIGS. 6, 10 and 11.

When the first bending section 4 is in initial state, the concave grooves of the jigs 14A, 14B, 15A, 15B, 16A and 16B are aligned on a straight line with each other as shown in FIG. 6, the linear wire rod 6 is inserted into the concave grooves of these jigs and supported by these jigs in the bridging state.

Then the drive mechanism 21 operates from this initial state so that the slider 25 moves toward the DX+ direction and thus the movable bases 20A and 20B are driven through the arms 26A and 26B, respectively, to rotate around the turning center 41. Since the jigs 14A, 15A and 16A are fixed to the movable base 20A and the jigs 14B, 15B and 16B are fixed to the movable base 20B, the jigs 14A, 15A and 16A and the jigs 14B, 15B and 16B rotate together with the rotation of the movable bases 20A and 20B, respectively. Thus the wire rod 6 is bent at its part on the folding centerline C until the center angle of the linking portion 17a becomes an angle θ1 that is the set angle based on the control data. The state after this first bending operation by this rotation of the jigs 14A, 15A and 16A and the jigs 14B, 15B and 16B is shown in FIG. 10.

When the central angle becomes the angle θ1, the drive mechanisms 28A and 28B operate so that the turning drive plate 38A moves toward the DY+ direction and the turning drive plate 38B moves toward the DZ+ direction. Thus the engagement concave portions 39A and 39B push the cam followers 33A and 33B, respectively, and thereby the turning plates 34A and 34B turn around their turning centers 44 as shown in detail in FIG. 12. The jigs 16A and 16B or the outermost jigs 16A and 16B rotate by this turning of the turning plates 34A and 34B, until the shoulder angle of the wire rod 6 becomes an angle θ2 that is the set angle based on the control data and thus U-shaped bending completes. The state after this second bending operation is shown in FIG. 11.

Figure 12:
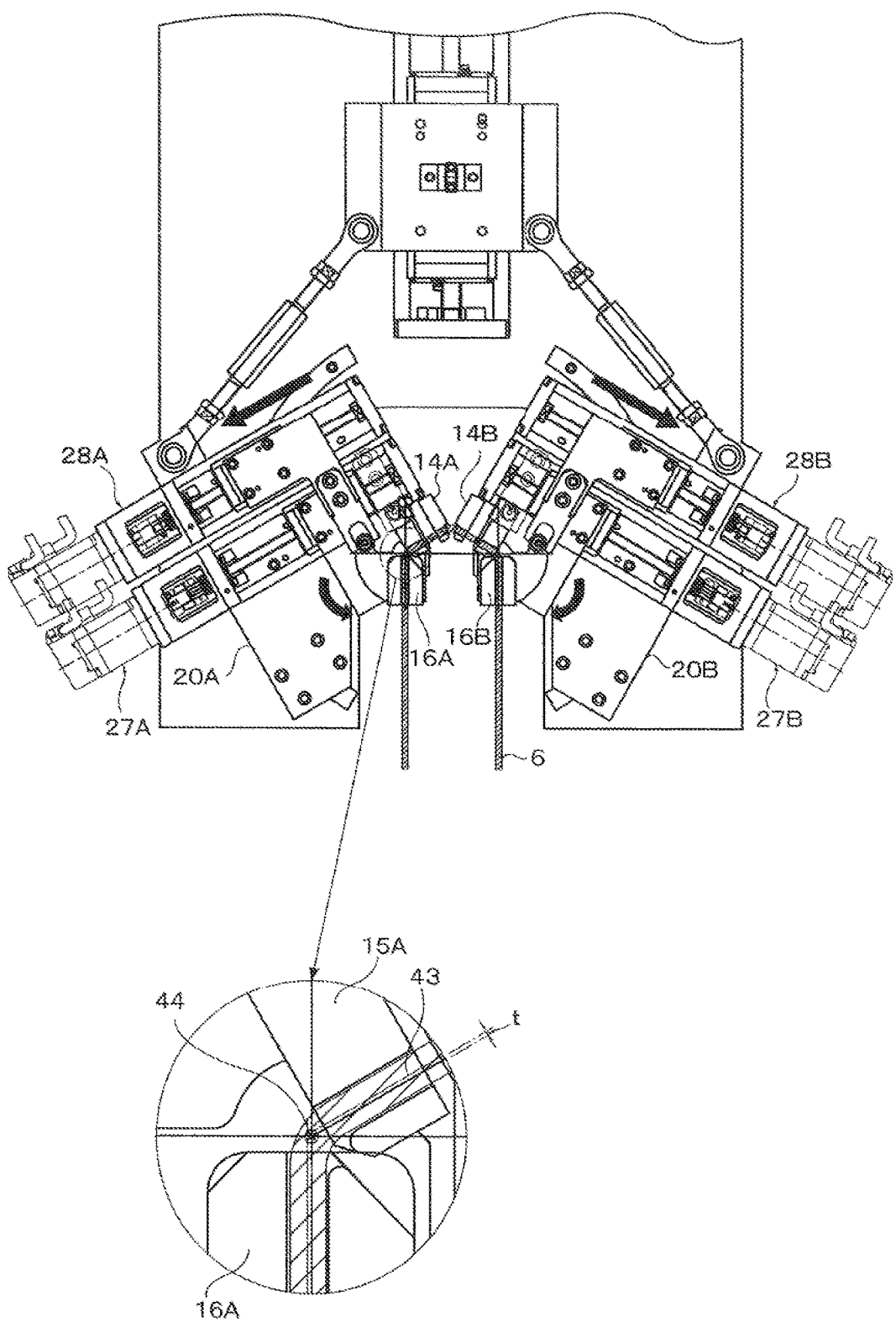
FIG. 12 is a plane view illustrating out of alignment of the turning center of a turning plate for turning an outermost jig from the center of the wire rod in the embodiment of FIG. 1.

The turning center 44 of the turning plates 34A and 34B namely the center of the rotation (turning) of the jigs 16A and 16B is set at a position as shown in FIG. 12 deviated from the centerline 43 of the wire rod 6 by a small distance t (for example, t=0.5 mm) toward the inner side of bending. When the wire rod 6 is bent to the edgewise direction, the expansion of the thickness occurs due to compression in the inner side of the bending and the contraction of the thickness occurs due to pulling in the outer side of the bending. Since this change of the thickness is bigger in the inner side of the bending than the outer side of the bending, the turning center 44 of the turning plates 34A and 34B namely the center of the rotation (turning) of the jigs 16A and 16B is deviated toward the inner side of bending so as to minimize the expansion and contraction of the wire rod 6 by the bending.

As aforementioned, the length of each side of the linking portion 17a of the first bent body 17A can be adjusted by changing the distance m between the jigs 14A and 15A and the distance m between the jigs 14B and 15B. The width (coil width) of the U-shaped first bent body 17A is adjusted by changing the length of each side of the linking portion 17a and thus a satisfied coil segment can be fabricated. The changes in the distances m are accomplished by the drive mechanisms 27A and 27B, respectively. That is, when the drive mechanisms 27A and 27B operate, the slide plate 32A to which the jigs 15A and 16A (the outermost jig 16A and the jig 15A next to the outermost jig 16A) are attached linearly moves in the DU direction and the slide plate 32B to which the jigs 15B and 16B are attached linearly moves in the DV direction resulting the distances m to change. Since the cam followers 33A and 33B are fixed as aforementioned to the slide plates 32A and 32B, respectively, and also these cam followers 33A and 33B engage with the engagement concave portions 39A and 39B of the turning drive plates 38A and 38B, respectively, the drive mechanisms 27A and 27B operate so that the turning drive plates 38A and 38B move in synchronization with the slide plates 32A and 32B. In the following description, these synchronizing movements are abbreviated as movement of only the slide plates 32A and 32B.

Figure 13:
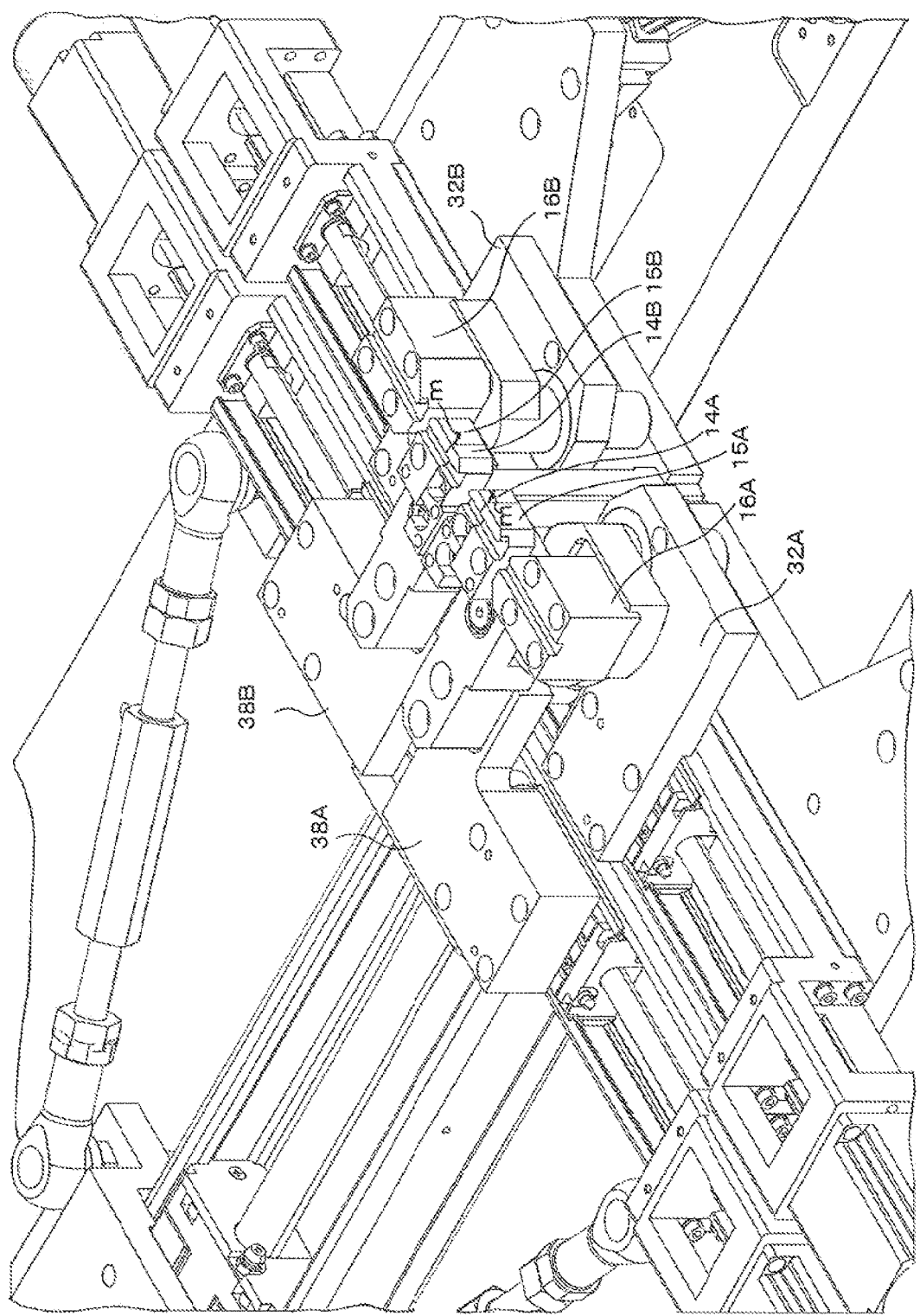
FIG. 13 is a perspective view illustrating arrangement of jigs in case of forming the first bent body with the small coil width in the embodiment of FIG. 1.
Figure 14:
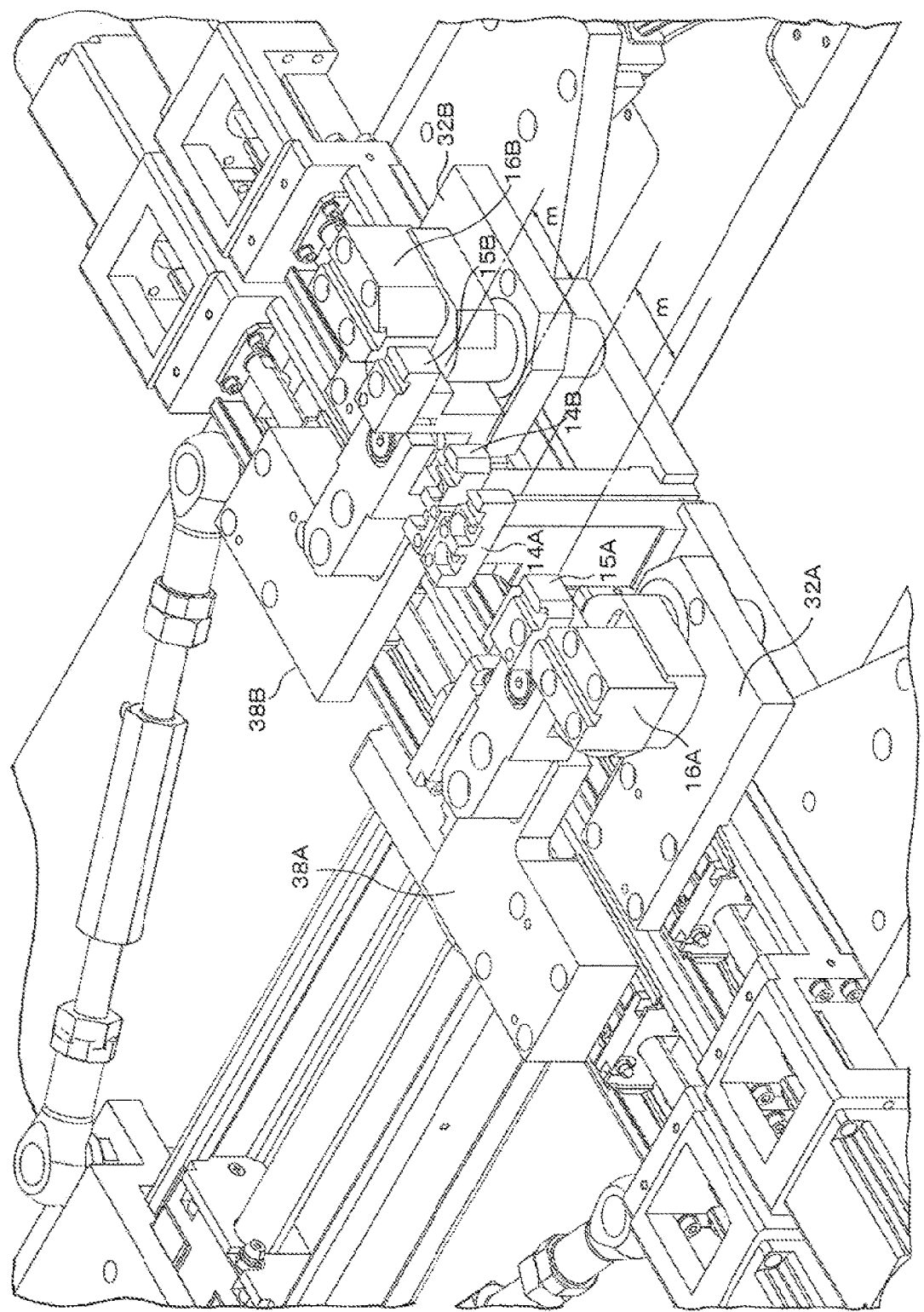
FIG. 14 is a perspective view illustrating arrangement of jigs in case of forming the first bent body with the large coil width in the embodiment of FIG. 1.

The setting of the distance m may be executed before bending, but it is possible to perform the setting after the bending is started until the jigs 16A and 16B rotate. These slide plates 32A and 32B are located at their home positions in the initial state before the bending starts, and then move from the home positions in response to given control data. In order to fabricate the first bent body 17A with a small coil width, the distance m between the jigs 14A and 15A and also the distance m between the jigs 14B and 15B are set small as shown in FIG. 13. Whereas, in order to fabricate the first bent body 17B with a large coil width, the distance m between the jigs 14A and 15A and the distance m between the jigs 14B and 15B are set large as shown in FIG. 14. The home positions of these jigs may be set at a position near the folding centerline C of the wire rod 6, or may be set at a position far from the folding centerline C.

Figure 15:
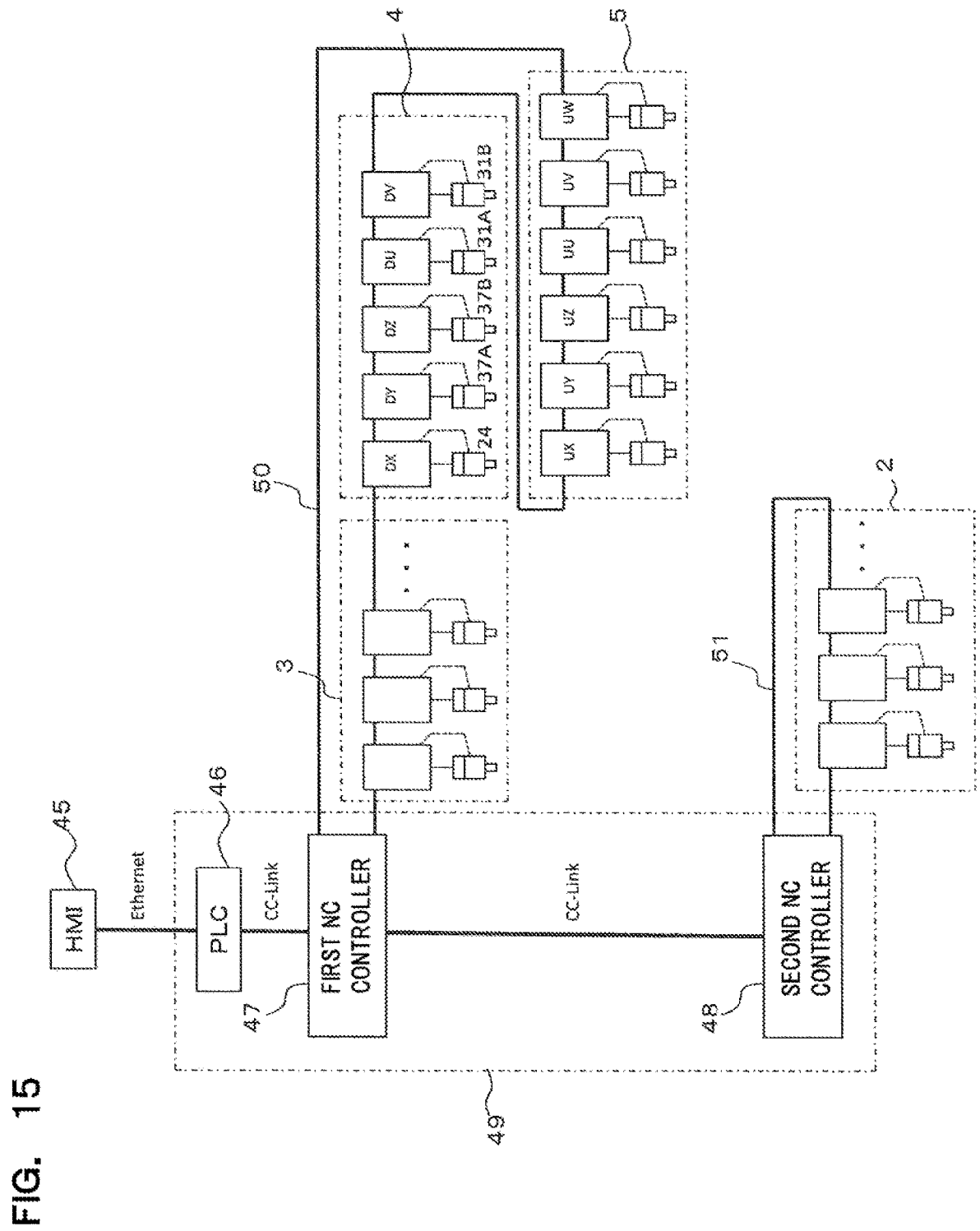
FIG. 15 is a block diagram schematically illustrating an electrical configuration of the coil segment forming apparatus in the embodiment of FIG. 1.

FIG. 15 shows an electrical configuration of the coil segment forming apparatus in this embodiment. As shown in the figure, the apparatus has a human-machine interface (HMI) 45 including an input and display means such as a touch panel, for inputting control data for shaping the wire rod, for instructing reading of control data stored in a memory, for instructing modification of the control data stored in the memory, for instructing start of the NC control, or for instructing end of the NC control for example. The HMI 45 is connected to a programmable logic controller (PLC) 46 through Ethernet (registered trademark). A first NC controller 47 and a second NC controller 48 are connected to the PLC 46 by means of a high-speed network such as CC-Link. The PLC 46 is provided with a memory for storing at least control data and control program for shaping coil segments with various kinds of shape, a central processing unit (CPU) and an input-output interface. The CPU transfers control data indicated by the program to the first NC controller 47 and the second NC controller 48. The first NC controller 47 expands control data of a length of the wire rod, a center angle θ1 of the coil segment, a pitch, and a shoulder angle θ2 of the coil segment, and data for executing multiaxial control with respect to the first bending section 4.

The first NC controller 47 also expands control data of bending and pressing, and data for executing multiaxial control with respect to the second bending section 5. The second NC controller 48 expands control data of coil arrangement or else in the coil assembling section 2. A control unit 49 for controlling the wire rod providing section 3, the first bending section 4, the second bending section 5 and the coil assembling section 2 is configured by the PLC 46, the first NC controller 47 and the second NC controller 48.

The first NC controller 47 is connected to the wire rod providing section 3, the first bending section 4 and the second bending section 5 through an optical communication cable 50 used for establishing servo-link. In the wire rod providing section 3, the first bending section 4 and the second bending section 5, a plurality of amplification and drive circuits are connected to the optical communication cable 50, and a plurality of servomotors are connected to the plurality of amplification and drive circuits, respectively. Signal lines from encoders mechanically coupled with the plurality of servomotors are connected to the plurality of amplification and drive circuits, respectively.

In this embodiment, as aforementioned, the first bending section 4 adopts the 5-axes control configuration, and therefore the amplification and drive circuit of the servomotor 24 for DX direction drive, the amplification and drive circuit of the servomotor 37A for DY direction drive, the amplification and drive circuit of the servomotor 37B for DZ direction drive, the amplification and drive circuit of the servomotor 31A for DU direction drive, and the amplification and drive circuit of the servomotor 31B for DV direction drive are connected to the optical communication cable 50.

The second NC controller 48 is connected to the coil assembling section 2 through an optical communication cable 51 used for establishing servo-link. In the coil assembling section 2, a plurality of amplification and drive circuits are connected to the optical communication cable 51, and a plurality of servomotors are connected to the plurality of amplification and drive circuits, respectively. Signal lines from encoders mechanically coupled with the plurality of servomotors are connected to the plurality of amplification and drive circuits, respectively.

Figure 16:
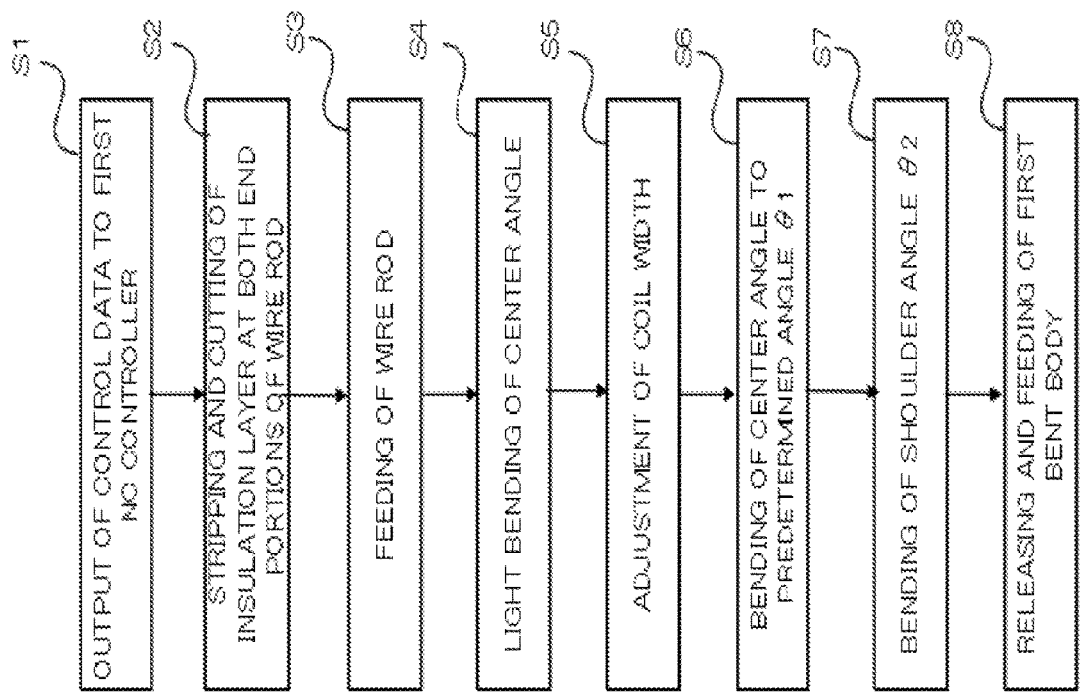
FIG. 16 is a flow chart schematically illustrating control processes of bending operations in the embodiment of FIG. 1.
Figure 17:
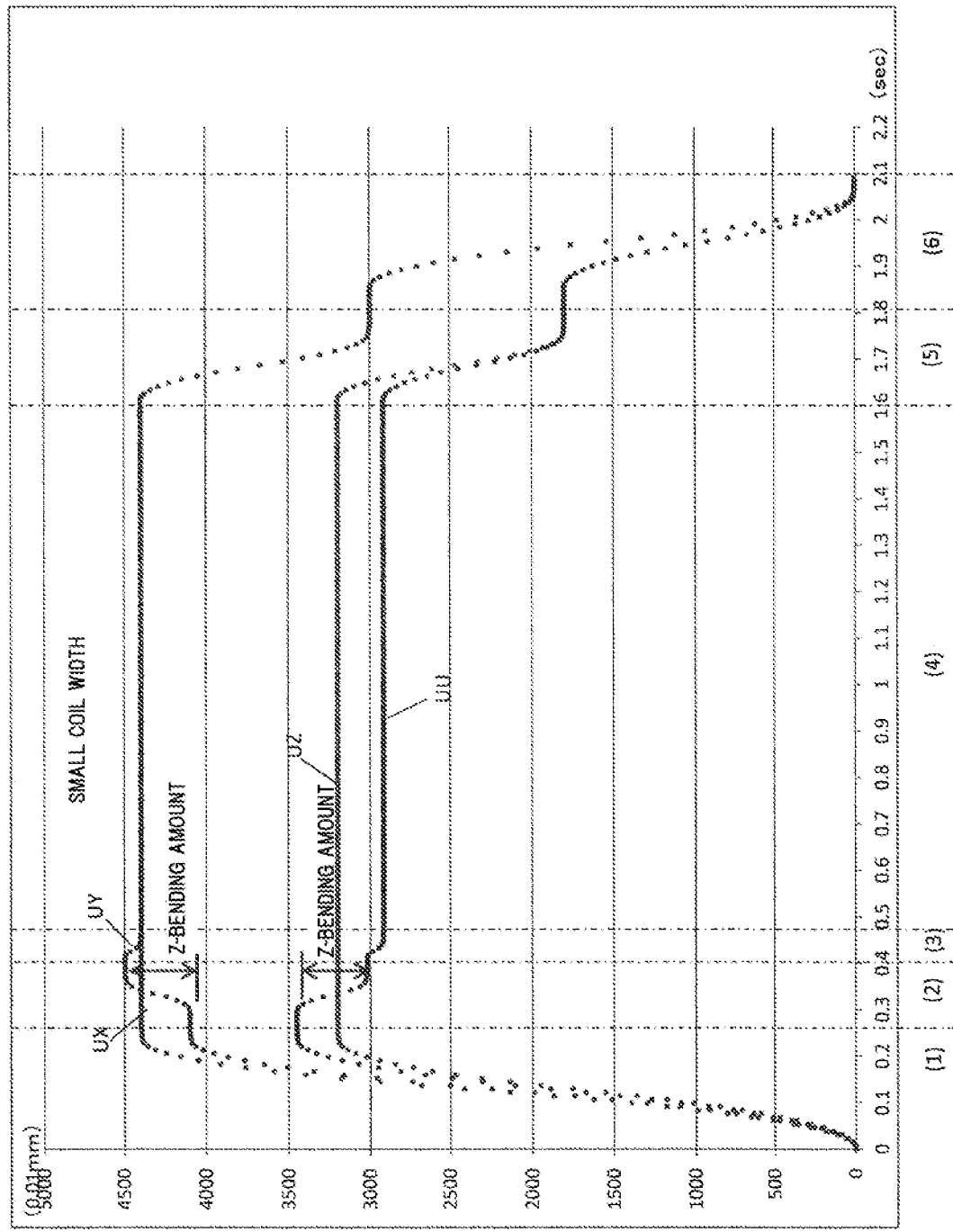
FIG. 17 is a timing chart illustrating the control processes of the bending operations in case of forming the first bent body with the small coil width in the embodiment of FIG. 1.

The PLC 46 and the first NC controller 47 control the first bending operation of the wire rod depending on steps shown in FIG. 16. Hereinafter, the first bending operation will be described in detail by using the flow chart of FIG. 16 and the timing chart of FIG. 17. It should be noted that the following description is in a case of the fabrication of a small coil width first bent body 17A with the length L1 in each side of its linking portion. In case of fabrication of a large coil width first bent body 17B with the length L2 in each side of its linking portion will be described later with reference to FIG. 18.

First, the PLC 46 reads out from the memory series of control data for defining a length, a center angle θ1, a length of each side of the linking portion 17a and a shoulder angle θ2 for example, with respect to a wire rod to be shaped next, and outputs the control data to the first NC controller 47 (Step S1).

The first NC controller 47 thereby expands the received control data and performs NC control of a drive mechanism with the designated address. The NC control of stripping or peeling of the insulation layer in the both peeling end areas of the wire rod by the peeling section 10 and cutting of the wire rod into a predetermined length by the cutting section 9 are performed at first (Step S2). More concretely, a control data with respect to the length of the wire rod 6 is expanded and output to the drive mechanism in the peeling section 10 for driving the corresponding servomotor so that stripping of the insulation layer in the both peeling end areas of the wire rod is performed. Also, a control data with respect to the length of the wire rod 6 is expanded and output to the drive mechanism in the cutting section 11 for driving the corresponding servomotor so that the wire rod is cut to a predetermined length.

Then, the first NC controller 47 performs NC control for feeding or transporting the cut wire rod 6 by a transporting mechanism not shown (Step S3). That is, the first NC controller 47 expands the control data for feeding or transporting and outputs the expanded control data to a drive mechanism in the transporting mechanism to drive the target servomotor so that the linear wire rod 6 cut into the predetermined length is fed or transported to the jigs 14A, 14B, 15A, 15B, 16A and 16B which were set in an initial state and that the wire rod 6 is inserted into the concave grooves 14A-1, 14B-1, 15A-1, 15B-1, 16A-1 and 16B-1 of these jigs.

Then, the first NC controller 47 performs NC control for starting slight bending of the center angle of the wire rod 6 by the drive mechanism 21 (Step S4). That is, the first NC controller 47 expands the control data for the slight bending of the central angle and outputs the expanded control data to the drive mechanism 21 to drive the target servomotor so that the folding operation with respect to the folding centerline of the wire rod 6 is started. More concretely, the servomotor of the drive mechanism 21 operates in response to the control data to turn the movable bases 20A and 20B and thus to slightly rotate or turn the jigs 14A, 14B, 15A, 15B, 16A and 16B mounted on these movable bases around 50% of the angle θ1 for example, so that the slight bending of the center angle of the wire rod 6 is performed. The region (1) shown in FIG. 17 corresponds to this operation of the drive mechanism 21.

The first NC controller 47 performs NC control for adjusting the coil width by the drive mechanisms 27A and 27B slightly after the start of the operation of the drive mechanism 21, that is, when the slider 25 moves by 30 mm for example (Step S5). Namely, the first NC controller 47 expands the control data for coil-width adjustment and outputs the expanded control data to the drive mechanisms 27A and 27B to drive the target servomotor so that the slide plates 32A and 32B move linearly. Thus, the slide plates 32A and 32B move from their home positions by movement amounts for obtaining a distance m that corresponds to the given control data for adjusting the length of each side of the linking portion (coil width). The region (1) shown in FIG. 17 corresponds to these operations of the drive mechanisms 27A and 27B.

Then, the NC controller 47 performs NC control for bending the central angle of the wire rod 6 to the set angle θ1 by the drive mechanism 21 (Step S6). Namely, the first NC controller 47 expands the control data for bending the central angle to the set angle θ1 and outputs the expanded control data to the drive mechanism 21 to drive the target servomotor so that the central angle of the wire rod 6 is bent to the set angle θ1. More concretely, in response to the control data, the servomotor of the drive mechanism 21 operates to turn the movable bases 20A and 20B and to rotate (turn) the jigs 14A, 14B, 15A, 15B, 16A and 16B thereon so that the center angle of the wire rod 6 is bent to the set angle θ1. The region (2) shown in FIG. 17 corresponds to this operation of the drive mechanism 21.

When the bending of the center angle of the wire rod 6 to the set angle θ1 is finished, the first NC controller 47 performs NC control for bending the shoulder angle of the wire rod 6 by the drive mechanisms 28A and 28B (Step S7). Namely, the first NC controller 47 expands the control data for bending of the shoulder angle and outputs the expanded control data to the drive mechanisms 28A and 28B to drive the target servomotor so that the shoulder angle of the wire rod 6 is bent. More concretely, in response to the control data, the servomotors of the drive mechanisms 28A and 28B operate to move the turning drive plates 38A and 38B by the predetermined distance in DY+ direction and the DZ+ direction, respectively, and to turn the turning plates 34A and 34B around their turning centers 44 so that the jigs 16A and 16B rotate (turn) for bending the shoulder angles to the set angle θ2. The region (3) shown in FIG. 17 corresponds to this operation of the drive mechanisms 28A and 28B.

The center angle θ1 and/or the shoulder angle θ2 are set from a point of view to bend the wire rod 6 harder in consideration of the spring-back compensation. In such bending operations, so-called spring-back phenomenon in which the bent amount is slightly restored by the elasticity of the materials when the pressing force is released after having bent may occur. The quantity of return by this spring-back is different due to parameters such as materials of the wire rod 6, a width d2 of the flatwise direction and a width w2 of the edgewise direction. According to the conventional bending method of bending the wire rod by using the press die, even if the forming surface of the press die was designed by considering the influence of the spring-back, undesirable spring-back influence was sometimes remained in the bent wire rod and thus the press die had to be redesigned and made again. Such redesign and remake invited forming cost of the press die, shaping cost of the coil segment and also manufacturing cost of the electrical rotating machine to increase. In case that the remake of the press die became multiple times, the manufacturing cost was extremely increased. Whereas according to this embodiment, because such spring-back influence can be cancelled by correcting the control data, no remake of the press die is necessary at all. In modifications of the present invention, control data for cancelling the spring-back influence may be preliminarily obtained by an experiment using the aforementioned parameters and a control table used in the NC control for bending the wire rod 6 may be made in accordance with the obtained control data, or shaping conditions for cancelling the spring-back influence may be automatically set depending on a kind of the input wire rod 6.

When the bending of the shoulder angle to the angle θ2 is finished, the first NC controller 47 performs NC control for dismounting and feeding or transferring the first bent body 17A that is a first bending-finished wire rod by means of the feed mechanism 12 shown in FIG. 1 (Step S8). Namely, the first NC controller 47 expands the control data for dismounting and feeding or transferring the first bent body 17A and outputs the expanded control data to the drive mechanism 21 to drive the target servomotor so that the first bent body 17A is gripped by a pair of chucking portions that is air cylinders, dismounted from the jigs 14A, 14B, 15A, 15B, 16A and 16B (picked up from the concave grooves), and fed or transferred to the second bending section 5. The region (4) shown in FIG. 17 corresponds to these operations of the drive mechanisms 21, 27A and 28A.

Thereafter, the first NC controller 47 resets the drive mechanisms in the first bending section 4 to prepare for first bending operation of the next coil segment. More concretely, the first NC controller 47 controls the drive mechanisms 27A and 27B so that the slide plates 32A and 32B slightly move back to the DU– direction and the DV– direction, respectively. The region (5) shown in FIG. 17 corresponds to this operation of the drive mechanism 27A. Then, the first NC controller 47 controls the drive mechanisms 28A and 28B so that the turning drive plates 38A and 38B move to a temporary position for moving-back in the DY+ direction and to a temporary position for moving-back in the DZ+ direction, respectively. The region (6) shown in FIG. 17 corresponds to this operation of the drive mechanism 28A. Because as aforementioned the slide plates 32A and 32B are engaged with the turning drive plates 38A and 38B through the cam followers and the engagement concave portions, respectively, it is impossible to move back these elements to their home positions directly. Therefore, these elements are moved back to the home positions through the stages of the regions (5) and (6) shown in FIG. 17. Then, the drive mechanism 21 begins to move back the slider 25 to the DX– direction. The region (7) shown in FIG. 17 corresponds to this operation of the drive mechanism 21. Then, at the timing of the end of moving back of slider 25, the first NC controller 47 controls the drive mechanisms 28A and 28B so that the turning drive plates 38A and 38B are reset to the DY+ direction and the DZ+ direction, respectively, and the drive mechanisms 27A and 27B so that the turning drive plates 32A and 32B are reset to the DU– direction and the DV– direction, respectively. The region (8) shown in FIG. 17 corresponds to these operations of the drive mechanisms 28A and 27A.

With respect to NC control of the second bending section 5 by means of the first NC controller 47 and NC control of the coil assembling section 2 by means of the second NC controller 48, explanations are omitted in this description.

Figure 18:
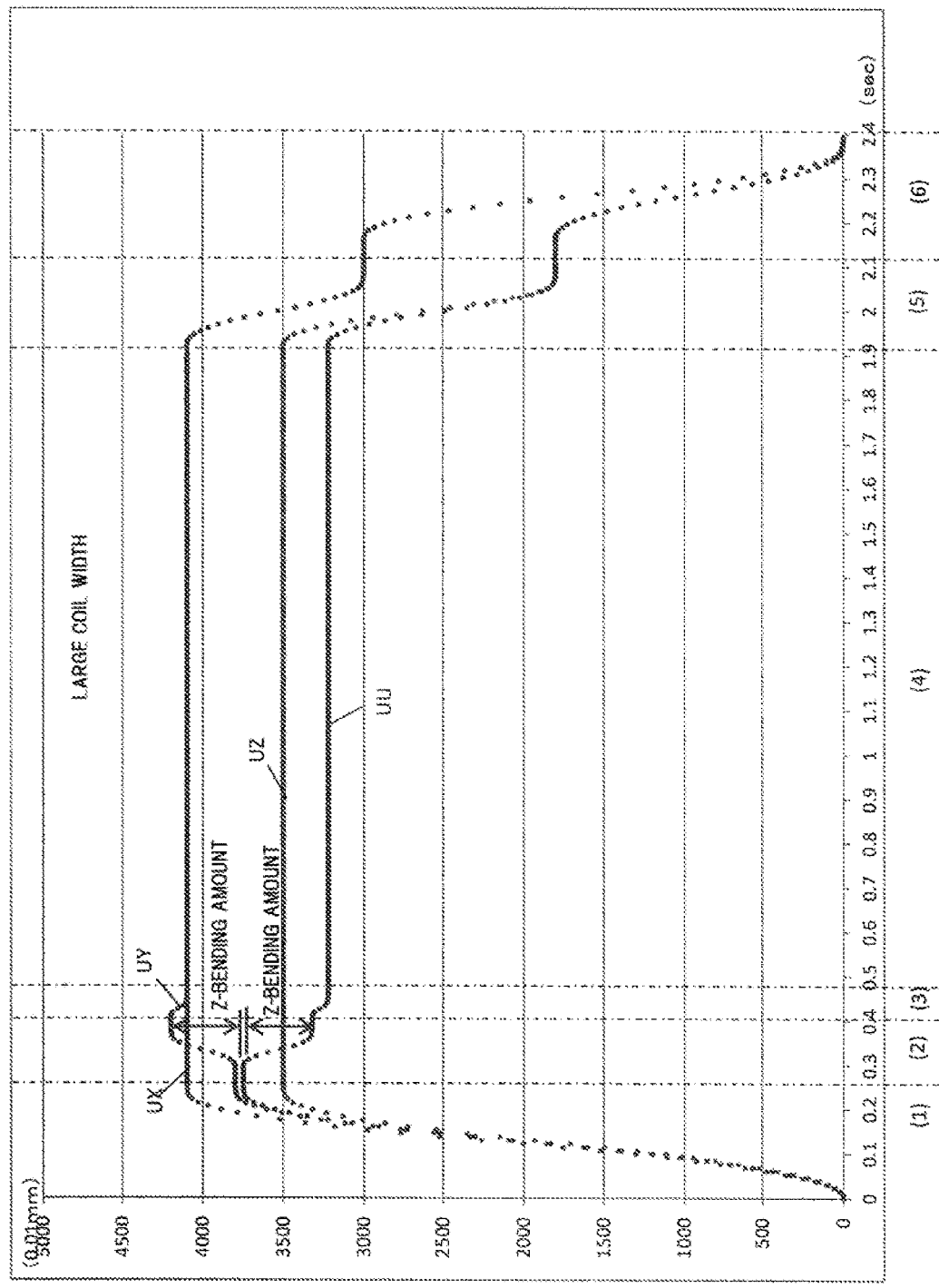
FIG. 18 is a timing chart illustrating the control processes of the bending operations in case of forming the first bent body with the large coil width in the embodiment of FIG. 1.

FIG. 18 is a timing chart illustrating the control processes of the first NC controller 47 in case of forming the first bent body 17B shown in FIG. 3 (b) with larger sides of the linking portion (large coil width). In the timing chart shown in FIG. 18, due to the large coil width, transferring amounts from the home positions of the turning drive plates 38A and 38B and the slide plates 32A and 32B are smaller than that shown in the timing chart of FIG. 17. Namely since the distances m between the jigs 14A and 15A and between the jigs 14B and 15B are large, the transferring amounts from the home positions set in the spaced-apart side from the bending center are decreased. Although the transferring amounts of the turning drive plates 38A and 38B are smaller than that of FIG. 17, since transferring amounts for rotating the jigs 16A and 16B are the same as that of FIG. 17, the line with respect to the DY direction (the drive mechanism 28A) and the line with respect to the DU direction (the drive mechanism 27A) come closer to each other in the region (4) shown in FIG. 18. Another control processes in this case are the same as these in the aforementioned embodiment and the similar functions and advantages can be obtained.

In the aforementioned embodiment, the first bent body of the coil segment has a line symmetry shape. However, according to the present invention, a first bent body with a line asymmetry shape can be formed by controlling the jigs 15A and 16A and the jigs 15B and 16B to have different transferring amounts with each other. Also, in the aforementioned embodiment, the jigs 14A and 14B are integrally fixed to the movable bases 20A and 20B, respectively, and the jigs 15A and 16A and the jigs 15B and 16B are integrally fixed to the turning plates 34A and 34B, respectively. However, according to the present invention, the jigs 14A, 14B, 15A, 15B, 16A and 16B may be transferred by using other drive mechanisms.

However, the configurations of the aforementioned embodiment can reduce the number of the drive mechanism and also can simplify the control system.

Figure 19:
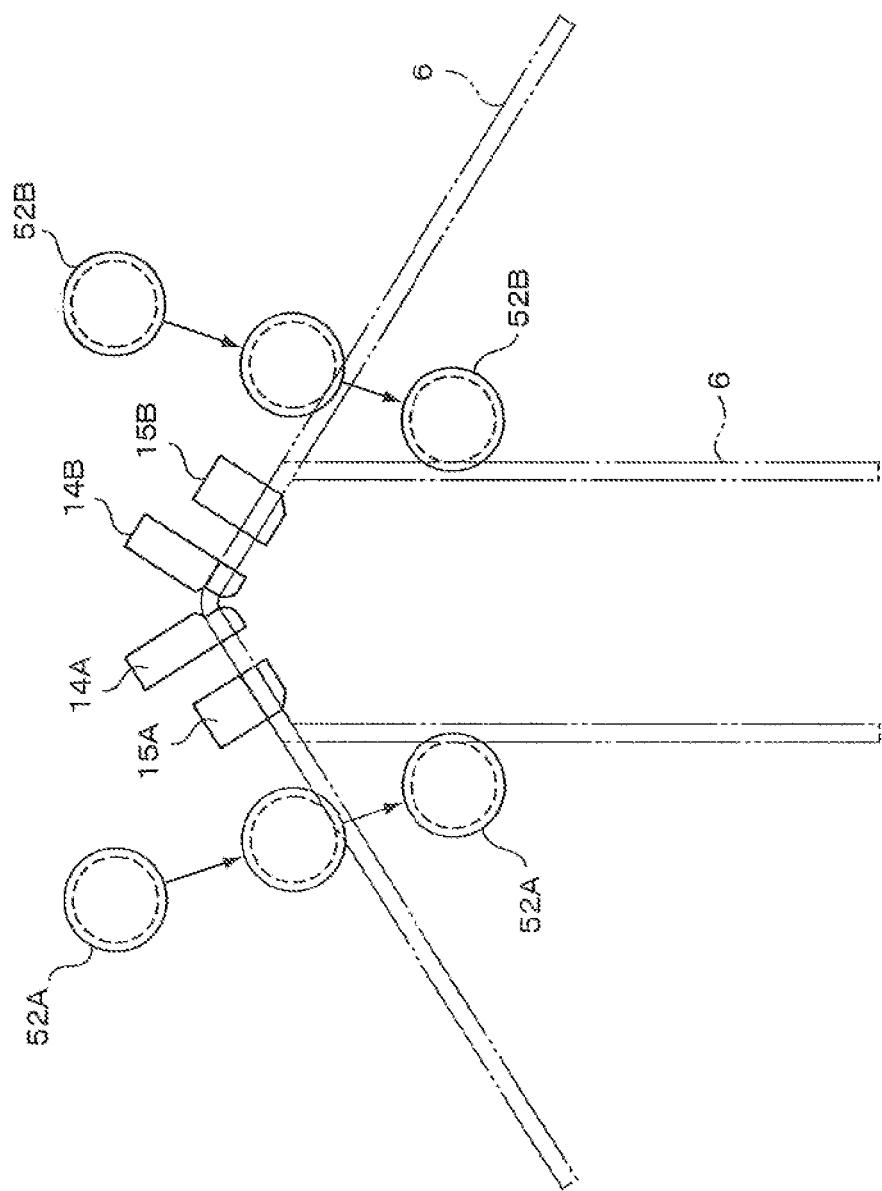
FIG. 19 is an essential part plane view illustrating a modified constitution of the first bending section.

Furthermore, in the aforementioned embodiment, the wire rod is bent by using all of the jigs 14A, 14B, 15A, 15B, 16A and 16B. However, in a modification according to the present invention, as shown in FIG. 19, roller jigs 52A and 52B can be used for bending the wire rod 6 instead of the jigs 16A and 16B. The roller jigs 52A and 52B have a circular axial section and an annular grove on its side surface to abut on the edgewise surface of the wire rod 6. These roller jigs 52A and 52B are rotatably supported and linearly moved to push the wire rod by their annular grooves so that the wire rod 6 is bent to have the shoulder angle θ2. In this case, the roller jigs 52A and 52B may approach into the bending region from the vertical direction with respect to the bending plane and thereafter may linearly move.

Many widely different embodiments of the present invention may be constructed without departing from the spirit and scope of the present invention. It should be understood that the present invention is not limited to the specific embodiments described in the specification, except as defined in the appended claims.

DENOTATION OF REFERENCE NUMERALS

1: coil segment forming apparatus
2: coil assembling section
3: wire rod providing section
4: first bending section
5: second bending section
6: wire rod
7: bobbin
8: feed direction switching section
9a, 9b: roller pair
10: peeling section
11: cutting section
12: feed mechanism
13: hold member
14A, 14B, 15A, 15B, 16A, 16B, 52A, 52B: jig
14A-1, 14B-1, 15A-1, 15B-1, 16A-1, 16B-1: concave groove
14A-2, 14B-2, 15A-2, 15B-2, 16A-2, 16B-2: edge portion
14A-3, 14B-3, 15A-3, 15B-3, 16A-3, 16B-3: chamfered portion
17a, 17a', 17a'': linking portion
17b, 17c: slot insertion portion
17A, 17B, 17C: first bent body
18: fixed base
19A, 19B: guide rail
20A, 20B: movable base
21, 27A, 27B, 28A, 28B: drive mechanism
22, 29A, 29B, 35A, 35B: ball screw portion
23, 30A, 30B, 36A, a 36B: nut portion
24, 31A, 31B, 37A, 37B: servomotor
25: slider
26A, 26B: arm
32A, 32B: slide plate
33A, 33B: cam follower
34A, 34B: turning plate
38A, 38B: turning drive plate
39A, 39B: engagement concave portion
40A, 40B: fitting member
41: turning center
42A, 42B: connection axis
43: centerline
45: HMI
46: PLC
47: first NC controller
48: second NC controller
49: control unit
50, 51: optical communication cable
100: manufacturing apparatus of electrical rotary machine
C: bending centerline

The invention claimed is:

1. A coil segment forming apparatus comprising a first bending section comprising:
a bending centerline of said first bending section;
base members comprising:
a left-side base member; and
a right-side base member, wherein the left-side base member and the right-side base member are symmetrically movable with each other with respect to a turning center located on the bending centerline;
jigs comprising:
a left-side innermost jig arranged on a plane of said left-side base member;
a left-side intermediate jig arranged on the plane of said left-side base member, the left-side intermediate jig linearly movable with respect to the left-side base member;
a left-side outermost jig arranged on the plane of said left-side base member, the left-side outermost jig linearly and rotatably movable with respect to the left-side base member;
a right-side innermost jig arranged on the plane of said right-side base member;
a right-side intermediate jig arranged on the plane of said right-side base member, the right-side intermediate jig linearly movable with respect to the right-side base member; and
a right-side outermost jig arranged on the plane of said right-side base member, the right-side outermost jig linearly and rotatably movable with respect to the right-side base member; and
drive mechanisms comprising;
a first drive mechanism for symmetrically and rotatably moving the left-side base member and the right-side base member around the turning center;
a second left-side drive mechanism for linearly moving each of the left-side intermediate jig and the left-side outermost jig with respect to the left-side base member;
a second right-side drive mechanism for linearly moving each of the right-side intermediate jig and the right-side outermost jig with respect to the right-side base member;
a third left-side drive mechanism for rotatably moving the left-side outermost jig on the plane with respect to the left-side base member; and
a third right-side drive mechanism for rotatably moving the right-side outermost jig on the plane with respect to the right-side base member;
wherein a linear wire rod supported by the jigs can be bent into a coil segment having a predetermined U shape having: a pair of slot insertion portions that are substantially parallel to each other and a linking portion for connecting said pair of the slot insertion portions,
wherein the predetermined U shape can be set by each moving amount of the base members and the jigs.

2. The coil segment forming apparatus as claimed in claim 1, wherein the right-side innermost jig is symmetrically arranged to the left-side innermost jig with respect to the bending centerline, wherein the right-side intermediate jig is symmetrically arranged to the left-side intermediate jig with respect to the bending centerline, and wherein, the right-side outermost jig is symmetrically arranged to the left-side outermost jig with respect to the bending centerline, the right-side outermost jig linearly and rotatably movable with respect to the right-side base member.

3. The coil segment forming apparatus as claimed in claim 1, wherein each of the jigs has a concave groove for accommodating said wire rod, and wherein the concave grooves of the jigs form a line at an initial state before the linear wire rod is bent by the jigs.

4. The coil segment forming apparatus according to claim 1, further comprising:
  a second bending section for bending the wire rod bent by said first bending section in another plane perpendicular to said plane; and
  a coil assembling section for assembling coil segments bent by said second bending section.

5. A coil segment forming method, comprising:
  a step of providing a coil segment forming apparatus comprising a first bending section comprising:
    a bending centerline of said first bending section;
    base members comprising:
      a left-side base member; and
      a right-side base member, wherein he left-side base member and the right-side base member are symmetrically movable with each other with respect to a turning center located on the bending centerline;
    jigs comprising:
      a left-side innermost jig arranged on a plane of said left-side base member;
      a left-side intermediate jig arranged on the plane of said left-side base member, the left-side intermediate jig linearly movable with respect to the left-side base member;
      a left-side outermost jig arranged on the plane of said left-side base member, the left-side outermost jig linearly and rotatably movable with respect to the left-side base member;
      a right-side innermost jig arranged on the plane of said right-side base member;
      a right-side intermediate jig arranged on the plane of said right-side base member, the right-side intermediate jig linearly movable with respect to the right-side base member; and
      a right-side outermost jig arranged on the plane of said right-side base member, the right-side outermost jig linearly and rotatably movable with respect to the right-side base member; and
    drive mechanisms comprising;
      a first drive mechanism for symmetrically and rotatably moving the left-side base member and the right-side base member around the turning center;
      a second left-side drive mechanism for linearly moving each of the left-side intermediate jig and the left-side outermost jig with respect to the left-side base member;
      a second right-side drive mechanism for linearly moving each of the right-side intermediate jig and the right-side outermost jig with respect to the right-side base member;
      a third left-side drive mechanism for rotatably moving the left-side outermost jig on the plane with respect to the left-side base member; and
      a third right-side drive mechanism for rotatably moving the right-side outermost jig on the plane with respect to the right-side base member;
  a step of supporting a linear wire rod by the jigs;
  a step of moving the base members and the jigs to bend the linear wire rod supported by the jigs into a coil segment having a predetermined U shape having: a pair of slot insertion portions that are substantially parallel to each other and a linking portion for connecting said pair of slot insertion portions,
wherein the predetermined U shape thus obtained can be set by each moving amount of the base members and the jigs.

* * * * *